United States Patent
Abedini et al.

(10) Patent No.: US 11,770,861 B2
(45) Date of Patent: Sep. 26, 2023

(54) TWO-STEP RANDOM ACCESS PROCEDURE FOR A BACKHAUL NODE

(71) Applicant: QUALCOMM incorporated, San Diego, CA (US)

(72) Inventors: Navid Abedini, Basking Ridge, NJ (US); Tao Luo, San Diego, CA (US); Wanshi Chen, San Diego, CA (US); Karl Georg Hampel, Hoboken, NJ (US); Jianghong Luo, Skillman, NJ (US); Luca Blessent, Whitehouse Station, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 30 days.

(21) Appl. No.: 17/344,502

(22) Filed: Jun. 10, 2021

(65) Prior Publication Data
US 2021/0392698 A1 Dec. 16, 2021

Related U.S. Application Data

(60) Provisional application No. 63/037,845, filed on Jun. 11, 2020.

(51) Int. Cl.
*H04W 74/08* (2009.01)
*H04W 74/00* (2009.01)
(Continued)

(52) U.S. Cl.
CPC ... *H04W 74/0841* (2013.01); *H04W 72/0446* (2013.01); *H04W 72/0453* (2013.01); *H04W 74/006* (2013.01); *H04W 88/14* (2013.01)

(58) Field of Classification Search
CPC .......... H04W 74/0841; H04W 74/006; H04W 74/0833; H04W 72/0453; H04W 88/04
See application file for complete search history.

(56) References Cited

U.S. PATENT DOCUMENTS

| | | | |
|---|---|---|---|
| 2016/0381615 A1* | 12/2016 | Nagaraja | H04W 36/14 455/436 |
| 2018/0103465 A1* | 4/2018 | Agiwal | H04W 74/006 |

(Continued)

OTHER PUBLICATIONS

AT&T: "2-Step RA Procedure for NR", 3GPP Draft, 3GPP TSG RAN1 NR Ad Hoc Meeting, R1-1700311, 2-Step RA Procedure for NR, 3rd Generation Partnership Project (3GPP), Mobile Competence Centre, 650, Route Des Lucioles, F-06921 Sophia-Antipolis Cedex, France, vol. RAN WG1, No. Spokane, USA, Jan. 16, 2016-Jan. 20, 2016, Jan. 16, 2017 (Jan. 16, 2017), XP051207849, 2 Pages, Retrieved from the Internet: URL: http://www.3gpp.org/ftp/Meetings_3GPP_SYNC/RAN1/Docs/. [Retrieved on Jan. 16, 2017] Section 2.1, p. 1-p. 2.

(Continued)

*Primary Examiner* — Jamal Javaid
(74) *Attorney, Agent, or Firm* — Holland & Hart LLP

(57) ABSTRACT

Methods, systems, and devices for wireless communications are described. For example, a first wireless node (e.g., an integrated access and backhaul (IAB) node) may receive, from a parent base station, system information that is indicative of two random access procedure configurations. The first random access procedure configuration may be for a two-step random access procedure and the second random access procedure configuration may be different from the first random access procedure configuration (for example, an IAB-specific, a user equipment (UE)-specific, or a four-step random access procedure). The first wireless node may determine to use the first random access procedure configuration (e.g., for establishing a wireless backhaul connection (Continued)

with the parent base station) and may perform the two-step random access procedure with the parent base station accordingly.

30 Claims, 20 Drawing Sheets

(51) Int. Cl.
*H04W 88/14* (2009.01)
*H04W 72/0453* (2023.01)
*H04W 72/0446* (2023.01)

(56) References Cited

U.S. PATENT DOCUMENTS

2020/0059957 A1   2/2020  Pan et al.
2020/0267761 A1*  8/2020  Lee .................. H04W 74/0808
2020/0351955 A1* 11/2020  Jeon ..................... H04W 76/27

OTHER PUBLICATIONS

International Search Report and Written Opinion—PCT/US2021/036942—ISA/EPO—dated Oct. 20, 2021.

* cited by examiner

TWO-STEP RANDOM ACCESS PROCEDURE FOR A BACKHAUL NODE

CROSS REFERENCE

The present application for patent claims the benefit of U.S. Provisional Patent Application No. 63/037,845 by ABEDINI et al., entitled "TWO-STEP RANDOM ACCESS PROCEDURE FOR A BACKHAUL NODE," filed Jun. 11, 2020, assigned to the assignee hereof, and expressly incorporated by reference herein.

FIELD OF TECHNOLOGY

The following relates generally to wireless communications and more specifically to two-step random access procedure for a backhaul node.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a base station, such as a parent integrated access and backhaul (IAB) node, may provide system information to at least child IAB nodes to enable the child nodes to communicate with the base station. The system information may include an indication of an IAB-specific random access channel (RACH) procedure configuration to be used by child IAB nodes. In some cases, the IAB-specific RACH procedure configuration is configured for static IAB nodes but the IAB node may be a mobile IAB node (e.g., IAB-mobile termination (MT)). As such, IAB-specific RACH procedure configuration may result in unsuccessful RACH transmissions or may introduce latency into the system when used by a mobile IAB node.

SUMMARY

The described techniques relate to improved methods, systems, devices, and apparatuses that support two-step random access procedure for a backhaul node. Generally, the described techniques provide for a backhaul node (e.g., an integrated access and backhaul (IAB) node) to perform a two-step random access procedure with a parent base station. For example, the parent base station may transmit system information that is indicative of a two-step random access procedure (e.g., a random access channel (RACH) procedure) configuration. In some cases, the system information may additionally be indicative of a second random access procedure configuration that is different from the first two-step random access procedure configuration. For example, the second random access procedure configuration may be specific to a user equipment (UE). Additionally or alternatively, the second random access procedure configuration may be a four-step random access procedure configuration. In some instances, when the parent base station provides two random access procedure configurations, the IAB node may select the first or second random access procedure configuration to perform a random access procedure with the parent base station to establish a wireless backhaul connection with the parent base station. For example, the TAB node may select a random access procedure configuration based on a measured reference signal receive power (RSRP). In another example, the IAB node may select the random access procedure configuration based on one or more other factors (e.g., a mobility of the IAB node, an RSRP variation, a failure of a previous RACH procedure).

A method of wireless communication at a first wireless node is described. The method may include receiving, from a parent base station, system information that is indicative of a first random access procedure configuration for a two-step random access procedure and a second random access procedure configuration different from the first random access procedure configuration, where the first wireless node is a wireless backhaul node to the parent base station, determining to use the first random access procedure configuration for communicating with the parent base station, and performing the two-step random access procedure with the parent base station in accordance with the first random access procedure configuration.

An apparatus for wireless communication at a first wireless node is described. The apparatus may include a processor, memory coupled with the processor, and instructions stored in the memory. The instructions may be executable by the processor to cause the apparatus to receive, from a parent base station, system information that is indicative of a first random access procedure configuration for a two-step random access procedure and a second random access procedure configuration different from the first random access procedure configuration, where the first wireless node is a wireless backhaul node to the parent base station, determine to use the first random access procedure configuration for communicating with the parent base station, and perform the two-step random access procedure with the parent base station in accordance with the first random access procedure configuration.

Another apparatus for wireless communication at a first wireless node is described. The apparatus may include means for receiving, from a parent base station, system information that is indicative of a first random access procedure configuration for a two-step random access procedure and a second random access procedure configuration different from the first random access procedure configuration, where the first wireless node is a wireless backhaul node to the parent base station, determining to use the first random access procedure configuration for communicating with the parent base station, and performing the two-step random access procedure with the parent base station in accordance with the first random access procedure configuration.

A non-transitory computer-readable medium storing code for wireless communication at a first wireless node is described. The code may include instructions executable by a processor to receive, from a parent base station, system information that is indicative of a first random access procedure configuration for a two-step random access procedure and a second random access procedure configuration different from the first random access procedure configuration, where the first wireless node is a wireless backhaul node to the parent base station, determine to use the first random access procedure configuration for communicating with the parent base station, and perform the two-step random access procedure with the parent base station in accordance with the first random access procedure configuration.

In some examples of the method, apparatuses, and non-transitory computer-readable medium described herein, determining to use the first random access procedure configuration may include operations, features, means, or instructions for determining that the first random access procedure configuration may be for a wireless backhaul-specific two-step random access procedure that may be different from a UE-specific two-step random access procedure, and selecting the first random access procedure configuration based on the first random access procedure configuration being for the wireless backhaul-specific two-step random access procedure.

In some examples of the method, apparatuses, and non-transitory computer-readable medium described herein, receiving system information that may be indicative of the first random access procedure configuration and the second random access procedure configuration further may include operations, features, means, or instructions for receiving the first random access procedure configuration and the second random access procedure configuration as separate configurations within the system information.

In some examples of the method, apparatuses, and non-transitory computer-readable medium described herein, receiving system information that may be indicative of the first random access procedure configuration and the second random access procedure configuration further may include operations, features, means, or instructions for receiving a common random access procedure configuration in the system information, receiving configuration-specific parameters in the system information, and determining the first random access procedure configuration and the second random access procedure configuration based on the common random access procedure configuration and the configuration-specific parameters.

Some examples of the method, apparatuses, and non-transitory computer-readable medium described herein may further include operations, features, means, or instructions for determining an RSRP associated with communications with the parent base station, comparing the determined RSRP with a threshold RSRP, and determining whether to switch between use of the first random access procedure configuration and the second random access procedure configuration based on the comparing.

Some examples of the method, apparatuses, and non-transitory computer-readable medium described herein may further include operations, features, means, or instructions for identifying that the determined RSRP exceeds the threshold RSRP based on the comparing, where determining to use the first random access procedure configuration may be based on identifying that the determined RSRP exceeds the threshold RSRP.

In some examples of the method, apparatuses, and non-transitory computer-readable medium described herein, determining whether to switch between use of the first random access procedure configuration and the second random access procedure configuration further may include operations, features, means, or instructions for identifying that the first random access procedure configuration may be for a wireless backhaul-specific two-step random access procedure and that the second random access procedure configuration may be for a wireless backhaul-specific four-step random access procedure, and using a wireless backhaul-specific threshold RSRP as the threshold RSRP based on the identification.

In some examples of the method, apparatuses, and non-transitory computer-readable medium described herein, determining whether to switch between use of the first random access procedure configuration and the second random access procedure configuration further may include operations, features, means, or instructions for identifying that the first random access procedure configuration may be for the two-step random access procedure and that the second random access procedure configuration may be for a four-step random access procedure, and that only one of the first random access procedure configuration and the second random access procedure configuration may be wireless backhaul-specific, and using, based on the identification, either a wireless backhaul-specific threshold RSRP, a non-wireless backhaul-specific threshold RSRP, or infinity as the threshold RSRP.

In some examples of the method, apparatuses, and non-transitory computer-readable medium described herein, determining whether to switch between use of the first random access procedure configuration and the second random access procedure configuration further may include operations, features, means, or instructions for identifying that the first random access procedure configuration may be for a non-wireless backhaul-specific two-step random access procedure and that the second random access procedure configuration may be for a non-wireless backhaul-specific four-step random access procedure, and using, based on the identification, either a wireless backhaul-specific threshold RSRP, a non-wireless backhaul-specific threshold RSRP, zero, or infinity as the threshold RSRP.

Some examples of the method, apparatuses, and non-transitory computer-readable medium described herein may further include operations, features, means, or instructions for identifying that the first random access procedure configuration may be for a wireless backhaul-specific two-step random access procedure, and that the second random access procedure configuration may be for a UE-specific two-step random access procedure, where determining to use the first random access procedure configuration may be based on a prohibition to use the UE-specific two-step random access procedure when the wireless backhaul-specific two-step random access procedure may be configured.

Some examples of the method, apparatuses, and non-transitory computer-readable medium described herein may further include operations, features, means, or instructions for identifying that the first random access procedure configuration may be for a UE-specific two-step random access procedure, and that the second random access procedure configuration may be for a wireless backhaul-specific two-step random access procedure, where determining to use the first random access procedure configuration may be based on a rule allowing use of the UE-specific two-step random access procedure when the wireless backhaul-specific two-step random access procedure may be configured.

In some examples of the method, apparatuses, and non-transitory computer-readable medium described herein, the rule may be that the UE-specific two-step random access procedure may be usable when the wireless backhaul-specific two-step random access procedure may be configured only when the first wireless node may be a mobile wireless node.

In some examples of the method, apparatuses, and non-transitory computer-readable medium described herein, the rule may be that the UE-specific two-step random access procedure may be usable when the wireless backhaul-specific two-step random access procedure may be configured only when a variation of an RSRP associated with communications with the parent base station exceeds a threshold RSRP variation.

In some examples of the method, apparatuses, and non-transitory computer-readable medium described herein, the rule may be that the UE-specific two-step random access procedure may be usable when the wireless backhaul-specific two-step random access procedure may be configured only when a variation of a channel quality indicator associated with communications with the parent base station exceeds a threshold channel quality indicator variation.

In some examples of the method, apparatuses, and non-transitory computer-readable medium described herein, the rule may be that the UE-specific two-step random access procedure may be usable when the wireless backhaul-specific two-step random access procedure may be configured only when the parent base station transmits signaling indicating the first random access procedure configuration for connecting with the parent base station via the UE-specific random access procedure.

In some examples of the method, apparatuses, and non-transitory computer-readable medium described herein, the signaling indicating the first random access procedure configuration includes downlink control information, a media access control-control element, radio resource control signaling, or a combination thereof.

In some examples of the method, apparatuses, and non-transitory computer-readable medium described herein, the rule may be that the UE-specific two-step random access procedure may be usable when the wireless backhaul-specific two-step random access procedure may be configured only when a quantity of retransmissions of a first message of the wireless backhaul-specific two-step random access procedure exceeds a threshold quantity of retransmissions.

In some examples of the method, apparatuses, and non-transitory computer-readable medium described herein, performing the two-step random access procedure further may include operations, features, means, or instructions for transmitting, during the two-step random access procedure, an indication to the parent base station that the first wireless node may be the wireless backhaul node.

In some examples of the method, apparatuses, and non-transitory computer-readable medium described herein, performing the two-step random access procedure further may include operations, features, means, or instructions for transmitting, during the two-step random access procedure, an indication to the parent base station of a mobility of the first wireless node.

In some examples of the method, apparatuses, and non-transitory computer-readable medium described herein, the first wireless node may be an integrated access backhaul node.

A method of wireless communication at a parent base station is described. The method may include transmitting, to a first wireless node, system information that is indicative of a first random access procedure configuration for a two-step random access procedure and a second random access procedure configuration different from the first random access procedure configuration, where the first wireless node is a wireless backhaul node to the parent base station, determining that the first random access procedure configuration is being used by the first wireless node for communicating with the parent base station, and performing the two-step random access procedure with the first wireless node in accordance with the first random access procedure configuration.

An apparatus for wireless communication at a parent base station is described. The apparatus may include a processor, memory coupled with the processor, and instructions stored in the memory. The instructions may be executable by the processor to cause the apparatus to transmit, to a first wireless node, system information that is indicative of a first random access procedure configuration for a two-step random access procedure and a second random access procedure configuration different from the first random access procedure configuration, where the first wireless node is a wireless backhaul node to the parent base station, determine that the first random access procedure configuration is being used by the first wireless node for communicating with the parent base station, and perform the two-step random access procedure with the first wireless node in accordance with the first random access procedure configuration.

Another apparatus for wireless communication at a parent base station is described. The apparatus may include means for transmitting, to a first wireless node, system information that is indicative of a first random access procedure configuration for a two-step random access procedure and a second random access procedure configuration different from the first random access procedure configuration, where the first wireless node is a wireless backhaul node to the parent base station, determining that the first random access procedure configuration is being used by the first wireless node for communicating with the parent base station, and performing the two-step random access procedure with the first wireless node in accordance with the first random access procedure configuration.

A non-transitory computer-readable medium storing code for wireless communication at a parent base station is described. The code may include instructions executable by a processor to transmit, to a first wireless node, system information that is indicative of a first random access procedure configuration for a two-step random access procedure and a second random access procedure configuration different from the first random access procedure configuration, where the first wireless node is a wireless backhaul node to the parent base station, determine that the first random access procedure configuration is being used by the first wireless node for communicating with the parent base station, and perform the two-step random access procedure with the first wireless node in accordance with the first random access procedure configuration.

In some examples of the method, apparatuses, and non-transitory computer-readable medium described herein, performing the two-step random access procedure further may include operations, features, means, or instructions for identifying a first set of time and frequency resources associated with a transmission, by the first wireless node, of a preamble of a first message of the two-step random access procedure, the first set of time and frequency resources at partially overlapping with a second set of time and frequency resources that may be conditionally available, unavailable, or a combination thereof, determining that the first set of time and frequency resources may be available for receiving the preamble of the first message, and receiving, from the first wireless node, the preamble of the first message of the two-step random access procedure in the first set of time and frequency resources based on determining that the first set of time and frequency resources may be available for receiving the preamble of the first message.

Some examples of the method, apparatuses, and non-transitory computer-readable medium described herein may further include operations, features, means, or instructions for identifying a third set of time and frequency resources associated with a transmission, by the first wireless node, of a payload of the first message of the two-step random access procedure, the third set of time and frequency resources at partially overlapping with the second set of time and frequency resources that may be conditionally available, unavailable, or a combination thereof, transmitting a grant, to the first wireless node, for a third message of a four-step random access procedure based on receiving the preamble of the first message and identifying the third set of time and frequency resources, and receiving the third message from the first wireless node based on transmitting the grant, where the third message includes the payload of the first message of the two-step random access procedure.

In some examples of the method, apparatuses, and non-transitory computer-readable medium described herein, performing the two-step random access procedure further may include operations, features, means, or instructions for identifying a third set of time and frequency resources associated with a transmission, by the first wireless node, of a payload of the first message of the two-step random access procedure, the third set of time and frequency resources at partially overlapping with the second set of time and frequency resources that may be conditionally available, unavailable, or a combination thereof, determining that the third set of time and frequency resources may be available for receiving the payload of the first message of the two-step random access procedure, and receiving, from the first wireless node, the payload of the first message of the two-step random access procedure by the third set of time and frequency resources.

Some examples of the method, apparatuses, and non-transitory computer-readable medium described herein may further include operations, features, means, or instructions for determining that the third set of time and frequency resources may be available for receiving the payload of the first message of the two-step random access procedure may be based on receiving the preamble of the first message of the two-step random access procedure from the first wireless node.

In some examples of the method, apparatuses, and non-transitory computer-readable medium described herein, transmitting system information that may be indicative of the first random access procedure configuration and the second random access procedure configuration further may include operations, features, means, or instructions for transmitting the first random access procedure configuration and the second random access procedure configuration as separate configurations within the system information.

In some examples of the method, apparatuses, and non-transitory computer-readable medium described herein, transmitting system information that may be indicative of the first random access procedure configuration and the second random access procedure configuration further may include operations, features, means, or instructions for transmitting a common random access procedure configuration in the system information, and transmitting configuration-specific parameters in the system information, where the first random access procedure configuration and the second random access procedure configuration may be based on the common random access procedure configuration and the configuration-specific parameters.

Some examples of the method, apparatuses, and non-transitory computer-readable medium described herein may further include operations, features, means, or instructions for configuring the first wireless node with a rule for using the first random access procedure configuration when the first random access procedure configuration may be for a UE-specific two-step random access procedure and when the second random access procedure configuration may be for a wireless backhaul-specific two-step random access procedure.

In some examples of the method, apparatuses, and non-transitory computer-readable medium described herein, the rule may be that the UE-specific two-step random access procedure may be usable when the wireless backhaul-specific two-step random access procedure may be configured only when the first wireless node may be a mobile wireless node.

In some examples of the method, apparatuses, and non-transitory computer-readable medium described herein, the rule may be that the UE-specific two-step random access procedure may be usable when the wireless backhaul-specific two-step random access procedure may be configured only when a variation of an RSRP associated with communications with the parent base station exceeds a threshold RSRP variation.

In some examples of the method, apparatuses, and non-transitory computer-readable medium described herein, the rule may be that the UE-specific two-step random access procedure may be usable when the wireless backhaul-specific two-step random access procedure may be configured only when a variation of a channel quality indicator associated with communications with the parent base station exceeds a threshold channel quality indicator variation.

In some examples of the method, apparatuses, and non-transitory computer-readable medium described herein, the rule may be that the UE-specific two-step random access procedure may be usable when the wireless backhaul-specific two-step random access procedure may be configured only when the parent base station transmits signaling indicating the first random access procedure configuration for connecting with the parent base station via the UE-specific random access procedure.

In some examples of the method, apparatuses, and non-transitory computer-readable medium described herein, the signaling indicating the first random access procedure configuration includes downlink control information, a media access control-control element, radio resource control signaling, or a combination thereof.

In some examples of the method, apparatuses, and non-transitory computer-readable medium described herein, the rule may be that the UE-specific two-step random access procedure may be usable when the wireless backhaul-specific two-step random access procedure may be configured only when a quantity of retransmissions of a first message of the wireless backhaul-specific two-step random access procedure exceeds a threshold quantity of retransmissions.

In some examples of the method, apparatuses, and non-transitory computer-readable medium described herein, performing the two-step random access procedure further may include operations, features, means, or instructions for receiving, during the two-step random access procedure, an indication from the first wireless node that the first wireless node may be the wireless backhaul node.

In some examples of the method, apparatuses, and non-transitory computer-readable medium described herein, performing the two-step random access procedure further may include operations, features, means, or instructions for receiving, during the two-step random access procedure, an indication from the first wireless node of a mobility of the first wireless node.

In some examples of the method, apparatuses, and non-transitory computer-readable medium described herein, the first wireless node may be an integrated access backhaul node.

DETAILED DESCRIPTION

Figure 1:
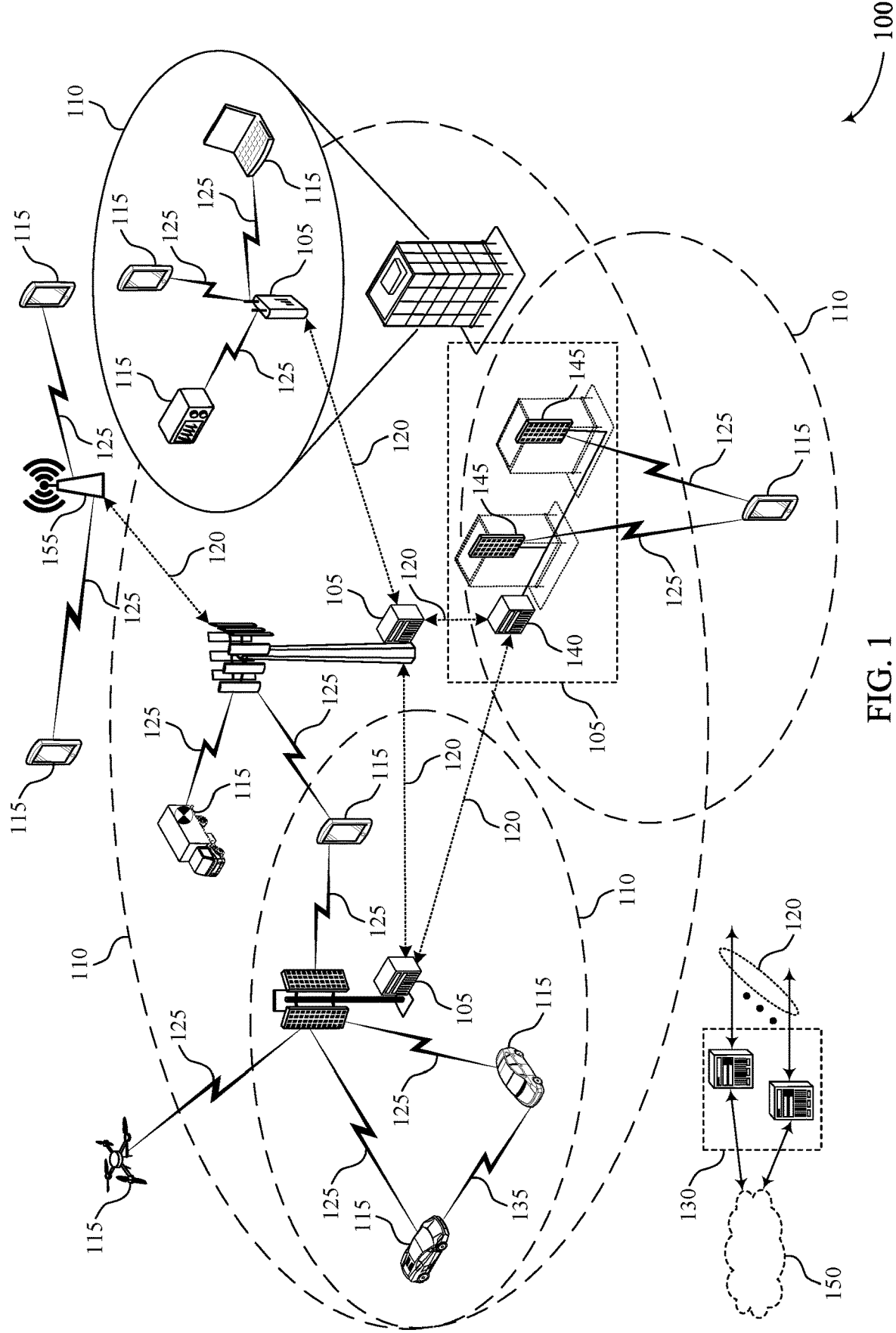
FIG. 1 illustrates an example of a system for wireless communications that supports two-step random access procedure for a backhaul node in accordance with aspects of the present disclosure.

Some wireless communications systems may be configured to support an integrated access and backhaul (IAB) network, where one or more access nodes have wireless backhaul connections to a network. The IAB network architecture may include a parent base station (e.g., an IAB donor node) with functions to control the IAB network that is connected to the core network and terminating with a UE, with any number of child IAB nodes in between that may act as relays for communication between the UE and the core network. For example, the parent base station may be in communication with a child IAB node that acts as a relay for communications between a UE and the core network (e.g., via the parent base station).

Child IAB nodes may perform a random access procedure (e.g., a random access channel (RACH) procedure) with the parent base station to establish a wireless backhaul connection with the parent base station. In some instances, IAB nodes may perform random access procedures in accordance with an IAB-specific four-step random access procedure configuration. The IAB-specific random access procedure configuration may be associated with a higher latency when compared to random access procedure configurations that are not specific to IAB nodes (e.g., UE-specific random access procedures). In some wireless communications systems, the IAB node may be stationary. Here, the IAB node may perform random access procedures relatively infrequently (e.g., when compared to a mobile wireless node) and maintain the wireless backhaul connection with the parent base station for an extended period of time. Thus, latency resulting from the random access procedure with the parent base station may not introduce significant latency into communications between UEs and the core network (e.g., via the IAB node and the parent base station) because the IAB node may perform relatively infrequent random access procedures. In some other wireless communications systems, the IAB node may be a mobile IAB node. Here, the IAB node may perform random access procedures with a higher frequency than a static IAB node. Thus, latency resulting from the random access procedure may introduce more latency into communications between UEs and the core network when compared to a static IAB node. Thus, it may be desirable to decrease latency associated with random access procedures between an IAB node and a parent base station.

To decrease latency associated with IAB random access procedures, the IAB node may be configured to perform a two-step random access procedure that may be associated with less latency than the IAB-specific four-step random access procedure. For example, the parent base station may transmit system information indicative of the two-step random access procedure configuration. In some cases, the parent base station may indicate a second random access procedure configuration to the IAB node by the system information. Here, the IAB node may be configured to select either the first two-step random access procedure configuration or the second random access procedure configuration for performing random access procedures with the parent base station based on one or more factors. For example, the second random access procedure configuration may be a four-step random access procedure configuration. Here, the IAB node may determine whether to perform a random access procedure in accordance with the first two-step configuration or the second four-step configuration based on a reference signal receive power (RSRP). In another example, the second random access procedure configuration may be a UE-specific random access procedure configuration. Here, the IAB node may determine whether to perform a random access procedure in accordance with the first two-step configuration or the second UE-specific configuration based on one or more factors (e.g., a mobility of the IAB node, an RSRP variation, a failure of a previous RACH procedure). Thus, the IAB node may be configured to perform a random access procedure associated with less latency than an IAB-specific four-step random access procedure.

Aspects of the disclosure are initially described in the context of wireless communications systems. Aspects of the disclosure are then described in the context of process flows. Aspects of the disclosure are further illustrated by and described with reference to apparatus diagrams, system diagrams, and flowcharts that relate to two-step random access procedure for a backhaul node.

FIG. 1 illustrates an example of a wireless communications system 100 that supports two-step random access procedure for a backhaul node in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, IAB nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Wireless communications system 100 may be configured to support an IAB network, where one or more access nodes have backhaul links 120 to the core network 130. The IAB network architecture may include a parent base station 105 (e.g., an IAB donor node) with functions to control the IAB network that is connected to the core network and terminating with a UE 115, with any number of child IAB nodes 155 in between that may act as relays for communication between the UE 115 and the core network 130. For example, the parent base station 105 may be in communication with a child IAB node 155 that acts as a relay for communications between a UE 115 and the core network 130 (e.g., via the parent base station 105).

TAB nodes 155 may perform a random access procedure (e.g., a RACH procedure) with the parent base station 105 to establish a backhaul link 120 (e.g., a wireless backhaul connection) with the parent base station 105. In some instances, IAB nodes 155 may perform random access procedures in accordance with an IAB-specific four-step random access procedure configuration. The IAB-specific random access procedure configuration may be associated with a higher latency when compared to random access procedure configurations that are not specific to IAB nodes (e.g., UE-specific random access procedures). In some cases, the IAB-specific random access procedure configuration may account for differences between IAB nodes 155 and UEs 115. For example, an IAB node 155 may be a half-duplex wireless communications node and may therefore be configured to either transmit communications or receive communications during a set of time resources. Additionally, round trip times (RTTs) associated with backhaul link 120 between the IAB node 155 and the parent base station 105 may be greater than RTTs associated with communication links 125 between the parent base station 105 and other UEs 115. In some cases, the increased RTTs associated with communications between the parent base station 105 and the IAB node 155 may be due to an increased distance between the IAB node 155 and the parent base station 105 when compared to a distance between the parent base station 105 and other UEs 115.

In some wireless communications systems 100, the IAB node 155 may be stationary. When the IAB node 155 is stationary, the IAB node 155 may perform random access procedures relatively infrequently (e.g., when compared to a mobile wireless node) and maintain the backhaul link 120 with the parent base station 105 for an extended period of time. Thus, latency resulting from the random access procedure with the parent base station 105 may not introduce significant latency into communications between UEs 115 and the core network 130 (e.g., via the IAB node 155 and the parent base station 105) because the IAB node 155 may perform relatively infrequent random access procedures. In some other wireless communications systems 100, the IAB node 155 may be a mobile IAB node 155. Here, the IAB node 155 may perform random access procedures with a higher frequency than a static IAB node 155. Thus, latency resulting from the random access procedure may introduce more latency into communications between UEs 115 and the core network 130 when compared to a static IAB node 155. Thus, it may be desirable to decrease latency associated with random access procedures between an IAB node 155 and a parent base station 105.

To decrease latency associated with IAB random access procedures, the IAB node 155 may be configured to perform a two-step random access procedure that may be associated with less latency than the IAB-specific four-step random access procedure. For example, the parent base station 105 may transmit system information indicative of the two-step random access procedure configuration. In some cases, the parent base station 105 may indicate a second random access procedure configuration to the IAB node 155 by the system information. Here, the IAB node 155 may be configured to select either the first two-step random access procedure configuration or the second random access procedure configuration for performing random access procedures with the parent base station 105 based on one or more factors. For example, the second random access procedure configuration may be a four-step random access procedure configuration. Here, the IAB node 155 may determine whether to perform a random access procedure in accordance with the first two-step configuration or the second four-step configuration based on an RSRP. In another example, the second random access procedure configuration may be a UE-specific random access procedure configuration. Here, the IAB node 155 may determine whether to perform a random access procedure in accordance with the first two-step configuration or the second UE-specific configuration based on one or more factors (e.g., a mobility of the IAB node 155, an RSRP variation, a failure of a previous RACH procedure). Thus, the IAB node 155 may be configured to perform a random access procedure associated with less latency than an IAB-specific four-step random access procedure.

Figure 2:
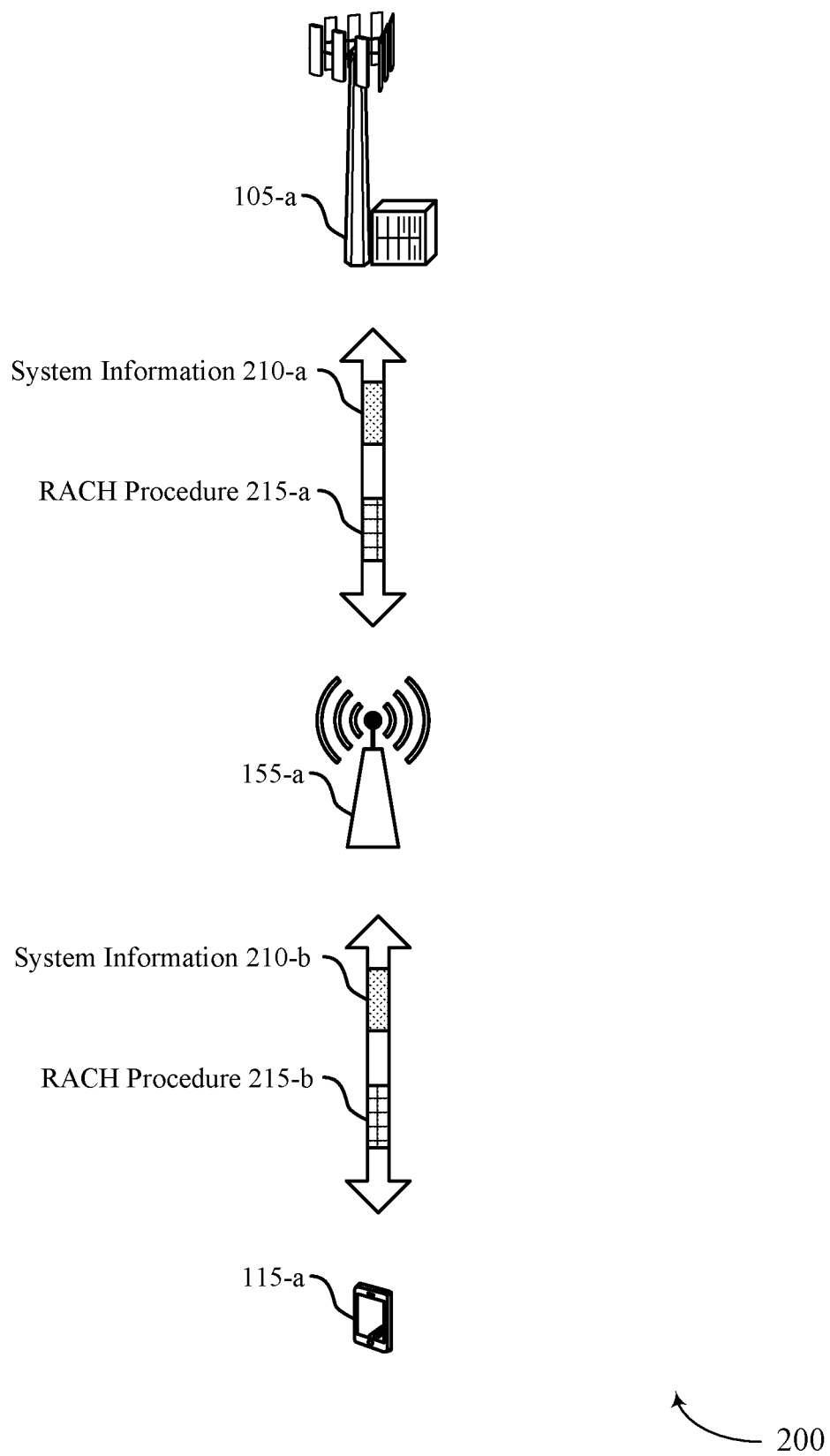
FIG. 2 illustrates an example of a wireless communications system that supports two-step random access procedure for a backhaul node in accordance with aspects of the present disclosure.

FIG. 2 illustrates an example of a wireless communications system 200 that supports two-step random access procedure for a backhaul node in accordance with aspects of the present disclosure. The wireless communications system 200 may include base station 105-a (e.g., a parent base station), an IAB node 155-a, and a UE 115-a, which may be examples of a base station 105, an IAB node 155, and a UE 115 as described with reference to FIG. 1. In some cases, the IAB node 155-a may perform the RACH procedure 215-a with the parent base station 105-a to attempt to establish a wireless backhaul connection (e.g., a backhaul link 120 as described with reference to FIG. 1) with the parent base station 105-a. Additionally, the UE 115-a may perform the RACH procedure 215-b with the IAB node 155-a to establish a communication link (e.g., a communication link 125) with the IAB node 155-a. Thus, the IAB node 155-a may provide a connection to the core network to the UE 115-a.

The parent base station 105-a may indicate one or more random access procedure (RACH procedure) configurations to the IAB node 155-a by the system information 210-a for the RACH procedure 215-a. The IAB node 155-a may then perform the RACH procedure 215-a in accordance with one of the RACH procedure configurations indicated by the system information 210-a and establish the wireless backhaul connection with the parent base station 105-a. In some other cases, the IAB node 155-a may perform the RACH procedure 215-a to establish a connection with the parent base station 105-a, to synchronize uplink transmissions, to request system information, or to perform a beam failure recovery operation. Additionally, the IAB node 155-a may transmit the system information 210-b to the UE 115-a to indicate a RACH procedure configuration to the UE 115-a. In some cases, the RACH procedure configuration indicated by the system information 210-b may be the same as one of the RACH procedure configurations indicated by the system information 210-a. In some other cases, the RACH procedure configuration indicated by the system information 210-b may be different from the RACH procedure configurations indicated by the system information 210-a. The IAB node 155-a and the UE 115-a may then perform the RACH procedure 215-b to establish a communication link between the IAB node 155-a and the UE 115-a in accordance with the RACH procedure configuration indicated by the system information 210-b.

When the parent base station 105-a transmits the system information 210-a to the IAB node 155-a, the parent base station 105-a may indicate at least one RACH procedure configuration that may be associated with a decreased latency when compared to an IAB-specific four-step RACH procedure configuration. For example, the system information 210-a may be indicative of a first RACH procedure configuration for a two-step RACH procedure to be performed between the IAB node 155-a and the parent base station 105-a. Additionally, the system information 210-a may indicate one or more second RACH procedure configurations to the IAB node 155-a that are different from the first RACH procedure configuration. In one example, the base station 105-a may indicate the two RACH procedure configurations separately. That is, the system information 210-a may indicate a first set of parameters for the first RACH procedure configuration and a second set of parameters associated with the second RACH procedure configuration. In another example, the base station 105-*a* may indicate a common RACH procedure configuration within the system information 210-*a*. For example, the system information 210-*a* may indicate a common RACH procedure configuration and one or more parameters specific to the first RACH procedure configuration or the second RACH procedure configuration.

In one example, the first RACH procedure configuration may be for an IAB-specific two-step RACH procedure while the second RACH procedure configuration may be for a UE-specific two-step RACH procedure. In some cases, the system information 210-*a* may separately configure the IAB-specific two-step RACH procedure and the UE-specific two-step RACH procedure. In another example, the system information 210-*a* may indicate a common two-step RACH procedure (e.g., the UE-specific RACH procedure) and may indicate one or more IAB-specific parameters to configure the IAB-specific two-step RACH procedure. For example, the system information 210-*a* may indicate a scaling factor and/or an offset to apply to the common two-step RACH procedure configuration to generate the IAB-specific two-step RACH procedure configuration.

In the example that the system information 210-*a* indicates a first IAB-specific two-step RACH procedure configuration and a second UE-specific two-step RACH procedure configuration, the IAB node 155-*a* may automatically use the IAB-specific two-step RACH procedure configuration (e.g., if the parent base station 105-*a* configures the IAB-specific two-step RACH procedure within the system information 210-*a*). In some other cases, the IAB node 155-*a* may be configured to switch between the IAB-specific two-step RACH procedure configuration and the UE-specific two-step RACH procedure configuration. For example, the IAB node 155-*a* may identify one or more rules indicating whether to perform the IAB-specific two-step RACH procedure or the UE-specific two-step RACH procedure configuration.

In another example, the system information 210-*a* may indicate a first two-step RACH procedure configuration and a second four-step RACH procedure configuration. Here, the IAB node 155-*a* may determine which RACH procedure configuration to utilize for the RACH procedure 215-*a* based on an RSRP threshold. For example, the IAB node 155-*a* may utilize the first two-step RACH procedure configuration if an RSRP associated with the parent base station 105-*a* exceeds the RSRP threshold. Additionally, the IAB node 155-*a* may utilize the second four-step RACH procedure configuration if the RSRP associated with the parent base station 105-*a* fails to meet the RSRP threshold.

When performing the RACH procedure 215-*a*, the parent base station 105-*a* may determine to utilize one or more resources (e.g., time resources, frequency resources) that may be otherwise unavailable for communications between the parent base station 105-*a* and the IAB node 155-*a*. For example, the parent base station 105-*a* may receive a first message of the RACH procedure 215-*a* by one or more time or frequency resources that are unavailable (e.g., NA resources) or conditionally available (e.g., soft resources). In some cases, only a portion of the first message of the RACH procedure 215-*a* (e.g., a preamble of the first message) may be received by the unavailable or conditionally available resources. Here, a remainder of the first message may be received by the parent base station 105-*a* by a set of available resources (e.g., hard resources).

Figure 3:
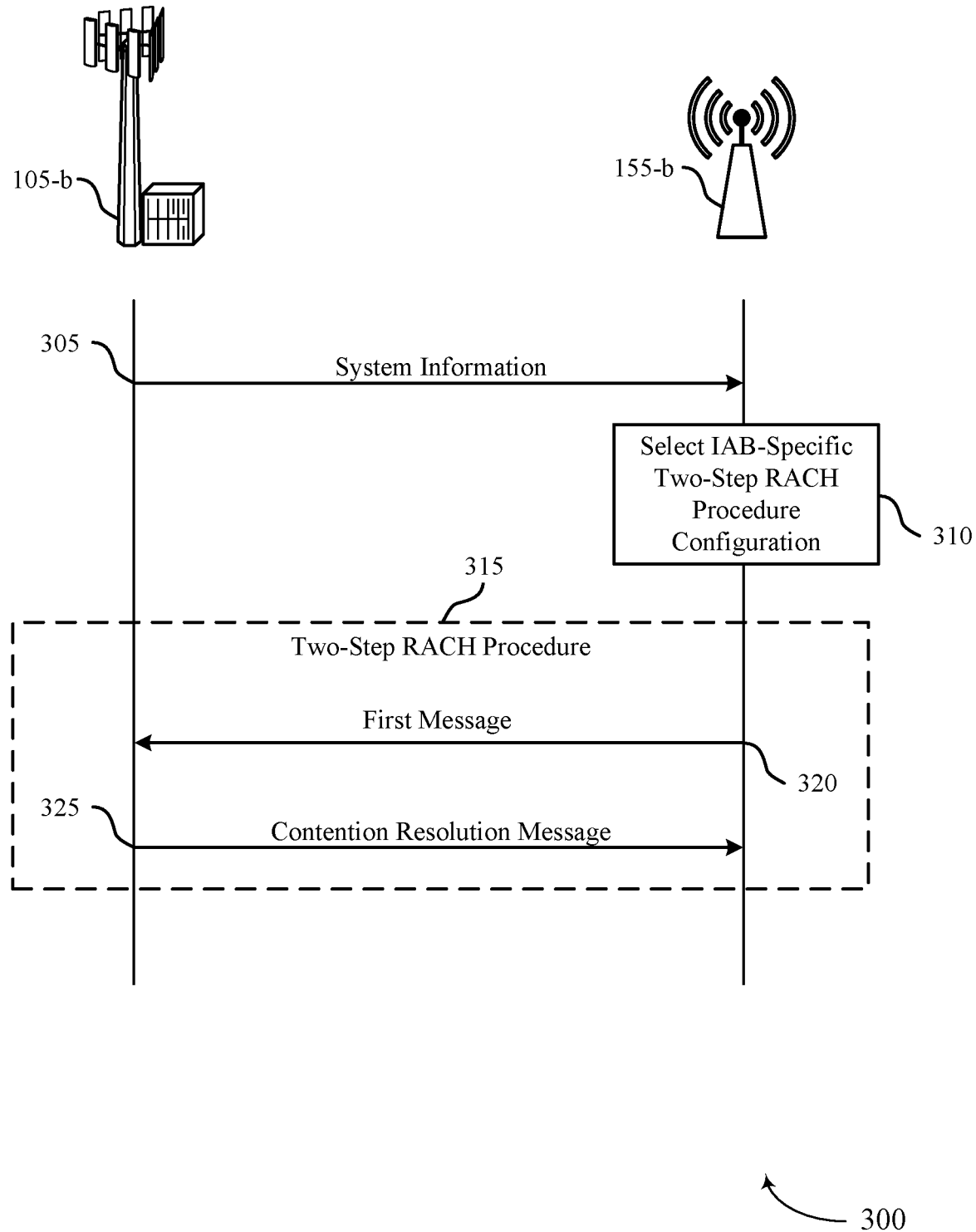
FIGS. 3 through 6 illustrate examples of process flows that support two-step random access procedure for a backhaul node in accordance with aspects of the present disclosure.

FIG. 3 illustrates an example of a process flow 300 that supports two-step random access procedure for a backhaul node in accordance with aspects of the present disclosure. The process flow 300 may include base station 105-*b* (e.g., a parent base station) and an IAB node 155-*b*, which may be examples of a base station 105 and an IAB node 155 as described with reference to FIGS. 1 and 2. During the process illustrated by the process flow 300, the IAB node 155-*b* may receive system information indicating two or more RACH procedure configurations including at least an IAB-specific two-step RACH procedure configuration. In some cases, the IAB-specific two-step RACH procedure may be associated with less latency than an IAB-specific four-step RACH procedure.

At 305, the parent base station 105-*b* may transmit system information to the IAB node 155-*b*. In some cases, the system information may indicate a first RACH procedure configuration (e.g., the first random access procedure configuration) for an IAB-specific two-step random access procedure and a second RACH procedure configuration (e.g., the second random access procedure configuration) for a UE-specific two-step RACH procedure. For example, the IAB-specific two-step RACH procedure configuration may indicate a RACH procedure with an extended RACH occasion when compared to the UE-specific RACH procedure.

In some cases, the system information may separately indicate the first RACH procedure configuration and the second RACH procedure configuration. In some other cases, the system information may indicate a common RACH procedure configuration and may additionally indicate one or more configuration-specific parameters. Here, the IAB node 155-*b* may generate the first RACH procedure configuration by applying the configuration-specific parameters to the common RACH procedure configuration. For example, the parent base station 105-*b* may indicate a scaling parameter, an offset, or both, to the IAB node 155-*b*. Here, the IAB node 155-*b* may apply the scaling parameter and offset to the common RACH procedure configuration to generate the first IAB-specific two-step RACH procedure configuration.

At 310, the IAB node 155-*b* may select the IAB-specific two-step RACH procedure configuration for performing a RACH procedure with the parent base station 105-*b*. For example, the IAB node 155-*b* may automatically select the IAB-specific two-step RACH procedure configuration in the case that the parent base station 105-*b* configures the IAB-specific two-step RACH procedure by the system information.

At 315, the IAB node 155-*b* and the parent base station 105-*b* may perform the IAB-specific two-step RACH procedure. For example, at 320 the IAB node 155-*b* may transmit a first message (e.g., Message A) of the IAB-specific two-step RACH procedure to the parent base station 105-*b*. The first message may include a preamble and a payload. For example, the first message may include a physical RACH (PRACH) preamble and a physical uplink shared channel (PUSCH) transmission. In some cases, the IAB node 155-*b* may include an indication within the first message that the IAB node 155-*c* is an IAB node (e.g., instead of another type of wireless node). Additionally, the IAB node 155-*b* may indicate, to the parent base station 105-*b*, a mobility state of the IAB node 155-*b*. For example, the IAB node 155-*b* may indicate to the parent base station 105-*b* whether the IAB Node 155-*b* is mobile or stationary. The IAB node 155-*b* may include this information (e.g., that the IAB node 155-*b* is an IAB node, a mobility state indication) within a payload of the first message. Additionally or alternatively, the IAB node 155-*b* may include this information within a PUSCH scrambling identifier or a demodulation reference signal (DMRS) sequence of the first message.

At 325, the parent base station 105-*b* may transmit a contention resolution message (e.g., Message B) to the IAB node 155-*b*. For example, the contention resolution message may be a random access response (RAR) message. In a case of a successful RACH procedure, the contention resolution message may indicate, to the IAB node 155-*b*, a successful completion of the RACH procedure. Thus, the IAB node 155-*b* may establish a wireless backhaul link with the parent base station 105-*b*. The IAB node 155-*b* may subsequently provide a backhaul connection (e.g., to one or more downstream wireless nodes such as a UE) based on the successful completion of the IAB-specific two-step RACH procedure with the parent base station 105-*b*.

Figure 4:
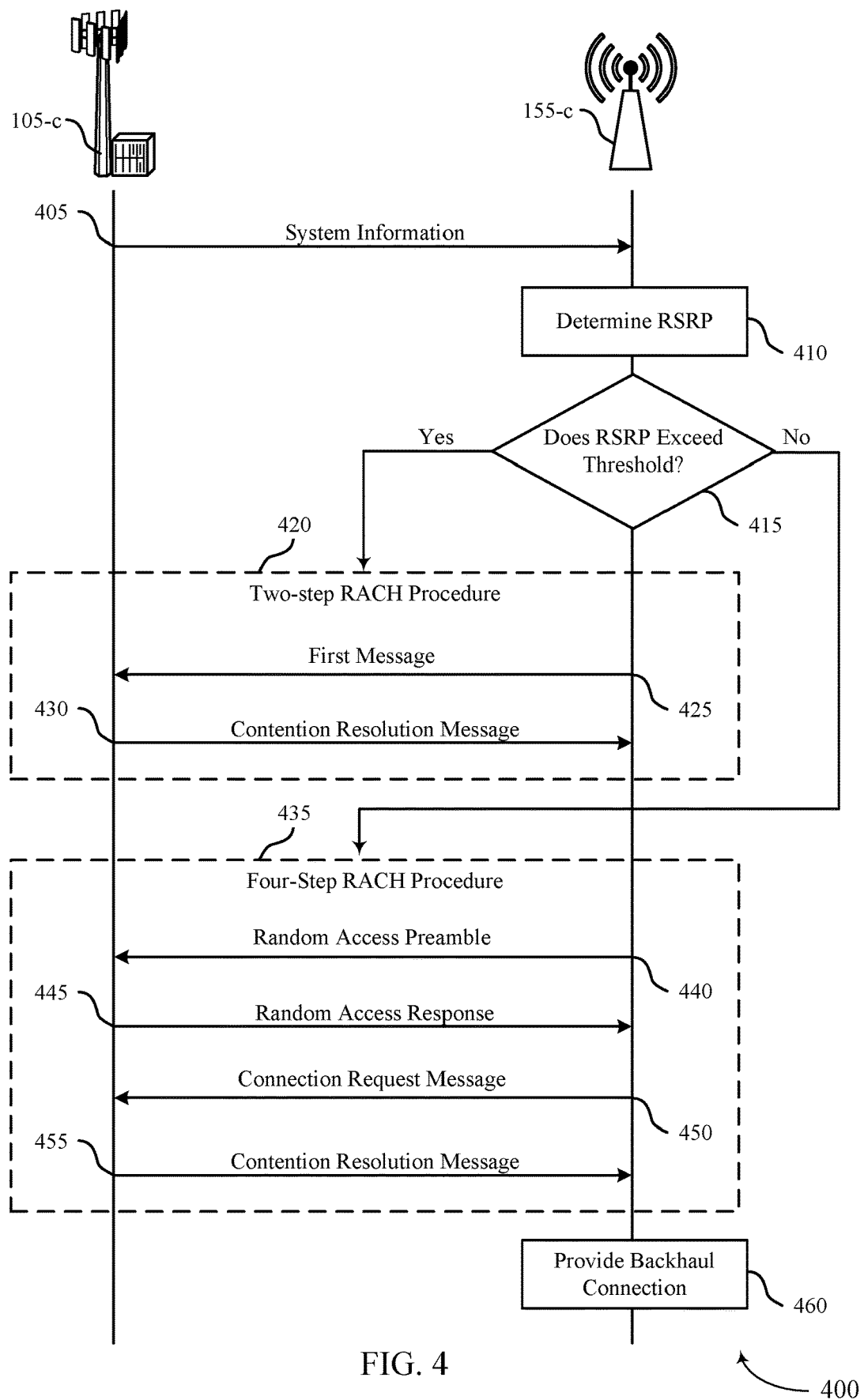

FIG. 4 illustrates an example of a process flow 400 that supports two-step random access procedure for a backhaul node in accordance with aspects of the present disclosure. The process flow 400 may include base station 105-*c* (e.g., a parent base station) and an IAB node 155-*c*, which may be examples of a base station 105 and an IAB node 155 as described with reference to FIGS. 1 through 3. During the process illustrated by the process flow 400, the IAB node 155-*c* may receive system information indicating two or more RACH procedure configurations including at least a two-step RACH procedure configuration and a four-step RACH procedure configuration.

At 405, the parent base station 105-*c* may transmit system information to the IAB node 155-*c*. In some cases, the system information may indicate a first RACH procedure configuration (e.g., the first random access procedure configuration) for a two-step RACH procedure and a second RACH procedure configuration (e.g., the second random access procedure configuration) for a four-step RACH procedure. In some cases, one or more of the RACH procedure configurations may be UE or IAB-specific RACH procedure configurations. For example, both the two-step RACH procedure and the four-step RACH procedure may by IAB-specific RACH procedure configurations. In another example, one of the RACH procedure configurations may be IAB-specific. For example, the two-step RACH procedure configuration may be IAB-specific and the four-step RACH procedure configuration may be non-IAB specific. In another example, the four-step RACH procedure configuration may be IAB-specific and the two-step RACH procedure configuration may be non-IAB specific. In another example, both the two-step RACH procedure configuration and the four-step RACH procedure configuration may be non-IAB specific RACH procedure configurations.

At 410, the IAB node 155-*c* may determine an RSRP associated with communications from the parent base station 105-*c*. For example, the parent base station 105-*c* may transmit one or more reference signals to the IAB node 155-*c* and the IAB node 155-*c* may subsequently determine the RSRP based on receiving one or more reference signals from the parent base station 105-*c*.

At 415, the IAB node 155-*c* may compare the determined RSRP to a threshold RSRP. For example, there may be a defined threshold RSRP (e.g., by the system information, predefined). In some cases, the threshold RSRP may be an IAB-specific threshold RSRP. In some other cases, the threshold RSRP may be a common or non-IAB specific threshold RSRP (e.g., common to IAB node 155-*c* and other wireless nodes such as UEs). By comparing the determined RSRP to the threshold RSRP, the IAB node 155-*c* may identify whether the determined RSRP exceeds the threshold RSRP.

If the IAB node 155-*c* determines that the determined RSRP exceeds the RSRP threshold, the IAB node 155-*c* may proceed to 420 and perform a two-step RACH procedure. In some cases, the threshold RSRP may be set to zero. Thus, the determined RSRP may always exceed the RSRP threshold. For example, when the four-step RACH procedure configuration is a non-IAB specific RACH procedure configuration, the threshold RSRP may be set to zero such that the IAB node 155-*c* may not use the non-IAB specific four-step RACH procedure configuration.

Additionally, if the IAB node 155-*c* determines that the determined RSRP fails to exceed the RSRP threshold, the IAB node 155-*c* may proceed to 435 and perform a four-step RACH procedure. In some cases, the threshold RSRP may be set to infinity. Thus, the IAB node 155-*c* may always determine that the determined RSRP fails to exceed the RSRP threshold. For example, when the two-step RACH procedure configuration is a non-IAB specific RACH procedure configuration, the threshold RSRP may be set to infinity such that the IAB node 155-*c* may not use the non-IAB specific two-step RACH procedure configuration.

At 420, the IAB node 155-*c* may perform a two-step RACH procedure with the parent base station 105-*c* in accordance with the first RACH procedure configuration (e.g., based on determining that the RSRP exceeds the RSRP threshold). For example, at 425 the IAB node 155-*c* may transmit a first message (e.g., Message A) of the IAB-specific two-step RACH procedure to the parent base station 105-*c*. The first message may include a preamble and a payload. For example, the first message may include a PRACH preamble and a PUSCH transmission. Additionally, the IAB node 155-*c* may indicate, to the parent base station 105-*c*, a mobility state of the IAB node 155-*c*. For example, the IAB node 155-*c* may indicate to the parent base station 105-*c* whether the IAB Node 155-*c* is mobile or stationary. The IAB node 155-*c* may include this information (e.g., that the IAB node 155-*c* is an IAB node, a mobility state indication) within a payload of the first message. Additionally or alternatively, the IAB node 155-*c* may include this information within a PUSCH scrambling identifier or a DMRS sequence of the first message.

At 430, the parent base station 105-*c* may transmit a contention resolution message (e.g., Message B) to the IAB node 155-*c*. For example, the contention resolution message may be an RAR message. In a case of a successful RACH procedure, the contention resolution message may indicate, to the IAB node 155-*c*, a successful completion of the RACH procedure. The IAB node 155-*c* may then proceed to 460.

At 435, the IAB node 155-*c* may perform a four-step RACH procedure with the parent base station 105-*c* in accordance with the second RACH procedure configuration (e.g., based on determining that the RSRP fails to exceed the RSRP threshold). For example, at 440 the IAB node 155-*c* may transmit a random access preamble (e.g., Message 1) to the parent base station 105-*c*. At 445, the parent base station 105-*c* may transmit an RAR (e.g., Message 2) to the IAB node 155-*c*. At 450, the IAB node 155-*c* may transmit a connection request message (e.g., Message 3) to the parent base station 105-*c*. At 455, the parent base station 105-*c* may transmit a contention resolution message (e.g., Message 4) to the IAB node 155-*c*. For example, the contention resolution message may be an RAR message and, in a case of a successful RACH procedure, may indicate a successful completion of the RACH procedure. The IAB node 155-*c* may then proceed to 460.

At 460, the IAB node 155-*c* may establish a wireless backhaul link with the parent base station 105-*c* based on a successful completion of a RACH procedure with the parent base station 105-*c*. The IAB node 155-*c* may subsequently provide a backhaul connection (e.g., to one or more downstream wireless nodes such as a UE) based on the successful completion of the RACH procedure with the parent base station 105-*c*.

Figure 5:
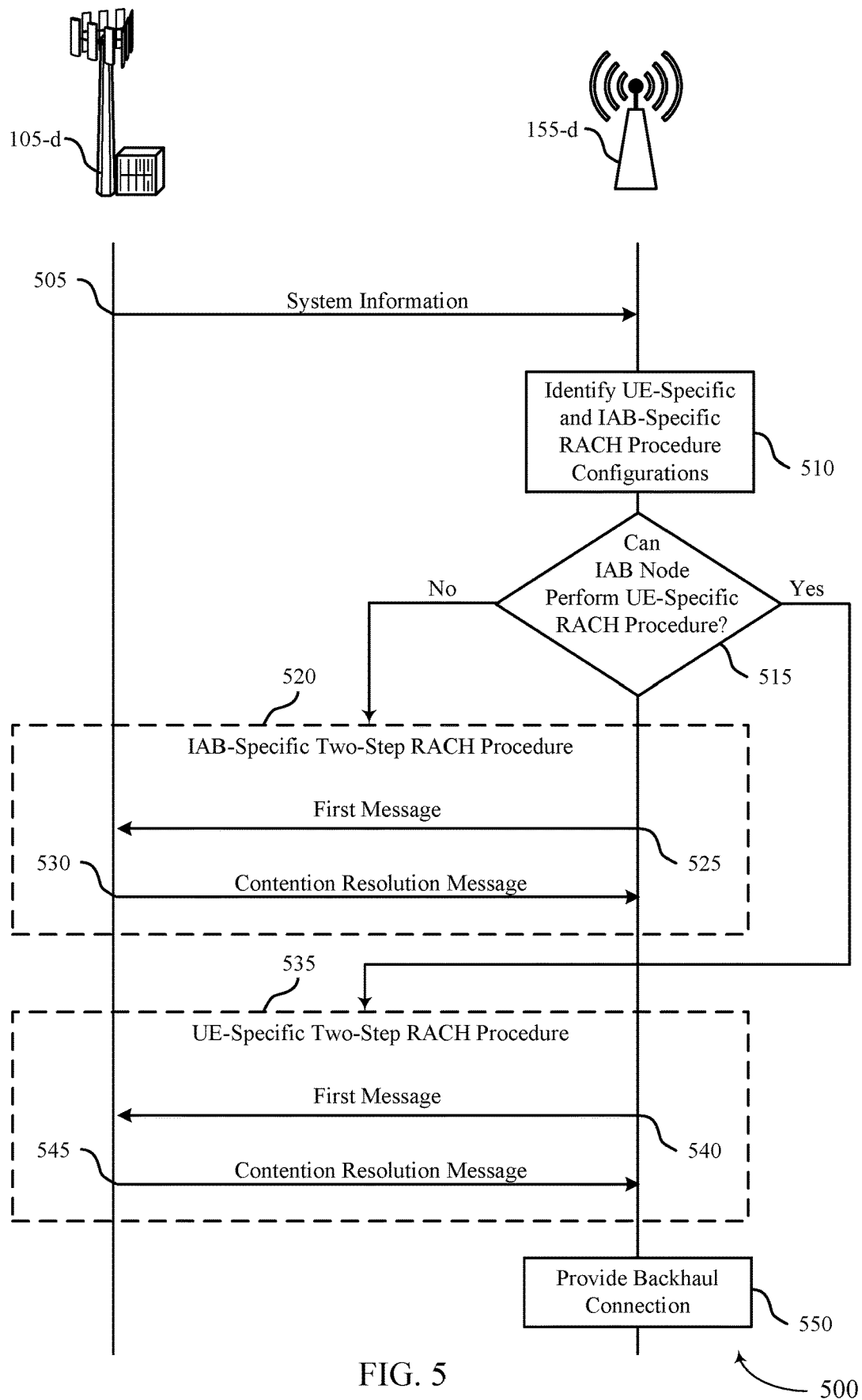

FIG. 5 illustrates an example of a process flow 500 that supports two-step random access procedure for a backhaul node in accordance with aspects of the present disclosure. The process flow 500 may include base station 105-*d* (e.g., a parent base station) and an IAB node 155-*d*, which may be examples of a base station 105 and an IAB node 155 as described with reference to FIGS. 1 through 4. During the process illustrated by the process flow 500, the IAB node 155-*d* may receive system information indicating two or more RACH procedure configurations including at least an IAB-specific two-step RACH procedure configuration and a UE-specific two-step RACH procedure configuration.

At 505, the parent base station 105-*d* may transmit system information to the IAB node 155-*d*. In some cases, the system information may indicate a first RACH procedure configuration (e.g., the first random access procedure configuration) for a UE-specific two-step RACH procedure and a second RACH procedure configuration (e.g., the second random access procedure configuration) for an IAB-specific two-step RACH procedure.

At 510, the IAB node 155-*d* may identify the first UE-specific two-step RACH procedure configuration and the second IAB-specific RACH procedure configuration based on receiving the system information from the parent base station 105-*d*.

At 515, the IAB node 155-*d* may determine whether the IAB node 155-*d* can use the UE-specific RACH procedure configuration. In some cases, the IAB node 155-*d* may determine that the IAB node 155-*d* may not use UE-specific RACH procedure configuration and may therefore always elect to use the IAB-specific two-step RACH procedure. In another case, the IAB node 155-*d* may always be allowed to use the UE-specific RACH procedure configuration. In some other cases, there may one or more rules indicating whether the IAB node 155-*d* can use the UE-specific RACH procedure configuration. That is, the rules may allow the IAB node 155-*d* to use UE-specific RACH procedure configuration in some instances.

For example, a rule may indicate that the IAB node 155-*d* may use the UE-specific RACH procedure configuration in the instance that the IAB node 155-*d* is a mobile IAB node 155-*d*. In another example, the rule may indicate that the IAB node 155-*d* may use the UE-specific RACH procedure configuration when a determined RSRP associated with communications with the parent base station 105-*d* exceeds a threshold RSRP. In another example, the rule may indicate that the IAB node 155-*d* may use the UE-specific RACH procedure configuration when a variation of an RSRP or channel quality indicator (CQI) associated with communications with the parent base station 105-*d* exceeds a threshold RSRP or CQI variation. In some cases, the RSRP or CQI variation indicates an amount of movement of the IAB Node 155-*d*. For example, an increase in movement of the IAB node 155-*d* may result in a similar increase in RSRP or CQI variation. In another example, the rule may indicate that the IAB node 155-*d* may use the UE-specific RACH procedure configuration when the parent base station 105-*d* transmits signaling (e.g., by DCI, a MAC-CE, RRC signaling) indicating the UE-specific RACH procedure configuration for connecting with the parent base station 105-*d* via the UE-specific random access procedure. In another example, the rule may indicate that the IAB node 155-*d* may use the UE-specific RACH procedure configuration when a quantity of retransmissions of a first message of the wireless backhaul-specific two-step random access procedure exceeds a threshold quantity of retransmissions. In another example, the rule may indicate that the IAB node 155-*d* may use the UE-specific RACH procedure configuration if the UE-specific RACH procedure configuration is indicated within an indication to perform the RACH procedure. For example, the parent base station 105-*d* may order a RACH procedure with the IAB node 155-*d* (e.g., by a physical downlink control channel (PDCCH) transmission) and may indicate, within the order, the UE-specific RACH procedure configuration.

If the IAB node 155-*d* determines that the IAB node 155-*d* is not allowed to use the UE-specific RACH procedure configuration, the IAB node 155-*d* may proceed to 520 and perform an IAB-specific two-step RACH procedure with the parent base station 105-*d*. Additionally, if the IAB node 155-*d* determines that the IAB node 155-*d* is allowed to use the UE-specific RACH procedure configuration, the IAB node 155-*d* may proceed to 535 and perform a UE-specific RACH procedure with the parent base station 105-*d*.

At 520, the IAB node 155-*d* may perform an IAB-specific two-step RACH procedure with the parent base station 105-*d* in accordance with the second RACH procedure configuration (e.g., based on determining that the IAB node 155-*d* may not use the UE-specific two-step RACH procedure configuration). For example, at 525 the IAB node 155-*d* may transmit a first message (e.g., Message A) of the IAB-specific two-step RACH procedure to the parent base station 105-*d*. The first message may include a preamble and a payload. For example, the first message may include a PRACH preamble and a PUSCH transmission. The IAB node 155-*d* may additionally indicate, to the parent base station 105-*d*, a mobility state of the IAB node 155-*d*. For example, the IAB node 155-*d* may indicate to the parent base station 105-*d* whether the IAB node 155-*d* is mobile or stationary. The IAB node 155-*d* may include this information (e.g., that the IAB node 155-*d* is an IAB node, a mobility state indication) within a payload of the first message. Additionally or alternatively, the IAB node 155-*d* may include this information within a PUSCH scrambling identifier or a DMRS sequence of the first message.

At 530, the parent base station 105-*d* may transmit a contention resolution message (e.g., Message B) to the IAB node 155-*d*. For example, the contention resolution message may be an RAR message. In a case of a successful RACH procedure, the contention resolution message may indicate, to the IAB node 155-*d*, a successful completion of the RACH procedure. The IAB node 155-*d* may then proceed to 550.

At 535, the IAB node 155-*d* may perform a UE-specific two-step RACH procedure with the parent base station 105-*d* in accordance with the first RACH procedure configuration (e.g., based on determining that the IAB node 155-*d* may use the UE-specific two-step RACH procedure configuration). For example, at 540 the IAB node 155-*d* may transmit a first message (e.g., Message A) of the IAB-specific two-step RACH procedure to the parent base station 105-*d*. At 530, the parent base station 105-*d* may transmit a contention resolution message (e.g., Message B) to the IAB node 155-*d*. In a case of a successful RACH procedure, the contention resolution message may indicate, to the IAB node 155-*d*, a successful completion of the RACH procedure. The IAB node 155-*d* may then proceed to 550.

At 550, the IAB node 155-*d* may establish a wireless backhaul link with the parent base station 105-*d* based on a successful completion of a RACH procedure with the parent base station 105-*d*. The IAB node 155-*d* may subsequently provide a backhaul connection (e.g., to one or more downstream wireless nodes such as a UE) based on the successful completion of the RACH procedure with the parent base station 105-*d*.

Figure 6:
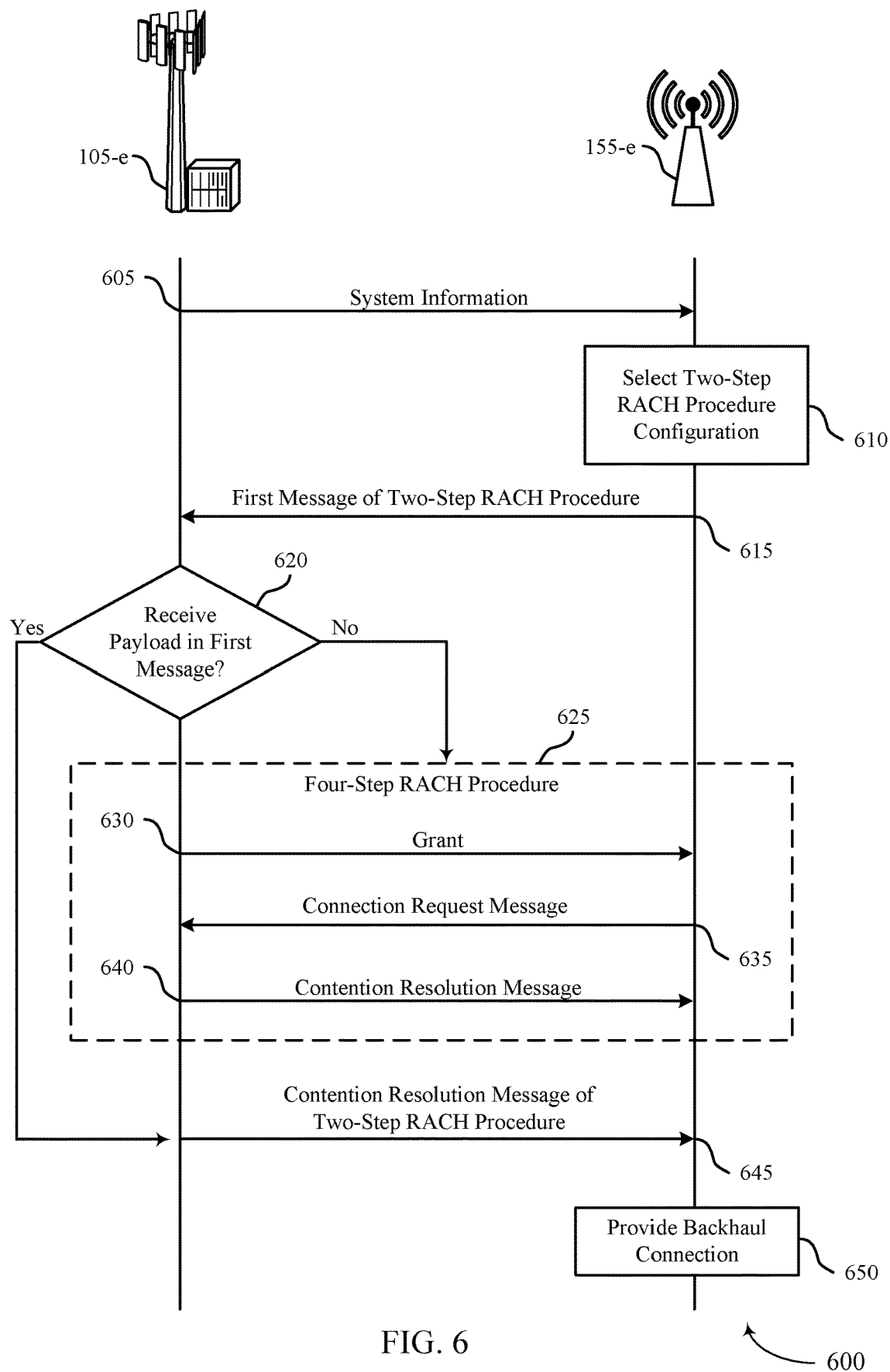

FIG. 6 illustrates an example of a process flow 600 that supports two-step random access procedure for a backhaul node in accordance with aspects of the present disclosure. In some examples, process flow 600 may implement aspects of wireless communications system 100. The process flow 600 may include base station 105-*e* (e.g., a parent base station) and an IAB node 155-*e*, which may be examples of a base station 105 and an IAB node 155 as described with reference to FIGS. 1 through 5. During the process illustrated by the process flow 600, the IAB node 155-*e* may receive system information indicating two or more RACH procedure configurations including at a two-step RACH procedure configuration.

At 605, the parent base station 105-*e* may transmit system information to the IAB node 155-*e*. In some cases, the system information may indicate a first RACH procedure configuration (e.g., the first random access procedure configuration) for a two-step RACH procedure and a second RACH procedure configuration (e.g., the second random access procedure configuration) different from the first RACH procedure configuration.

At 610, the IAB node 155-*e* may select a two-step RACH procedure configuration from the RACH procedure configurations indicated by the system information.

At 615, the IAB node 155-*e* may transmit a first message of the two-step RACH procedure in accordance with the RACH procedure configuration. The first message may include a preamble and a payload. For example, the first message may include a PRACH preamble and a PUSCH transmission. The IAB node 155-*e* may additionally indicate, to the parent base station 105-*e*, a mobility state of the IAB node 155-*e*. For example, the IAB node 155-*e* may indicate to the parent base station 105-*e* whether the IAB node 155-*e* is mobile or stationary. The IAB node 155-*e* may include this information (e.g., that the IAB node 155-*e* is an IAB node, a mobility state indication) within a payload of the first message. Additionally or alternatively, the IAB node 155-*e* may include this information within a PUSCH scrambling identifier or a DMRS sequence of the first message.

In some cases, the parent base station 105-*e* may receive at least a portion of the first message from the IAB node 155-*e* by a first set of time and frequency resources that at least partially overlap with a second set of time and frequency resources that are conditionally available (e.g. soft resources), unavailable (e.g., NA resources), or a combination of both. In some cases, the parent base station 105-*e* may assume that conditionally available and unavailable resources are available (e.g., hard resources) for receiving a preamble of the first message of the two-step RACH procedure with an IAB node 155-*c*. Thus, the parent base station 105-*e* may receive at least the preamble of the first message from the IAB node 155-*c*. In some cases, the parent base station 105-*e* may determine that the conditionally available and unavailable resources are available for any communication (e.g., communications other than communications with the IAB node 155-*e* for a RACH procedure). In some other cases, the parent base station 105-*e* may instead determine that the conditionally available and unavailable resources are available for RACH-specific communications and may not utilize the resources for non-RACH communications.

At 620, the parent base station 105-*e* may determine whether the payload of the first message of the two-step RACH procedure was received from the IAB node 155-*e*. For example, the parent base station 105-*e* may not exempt the payload portion of the first message. That is, the parent base station 105-*e* may not assume that conditionally available resources or unavailable resources are available for a reception of the payload of the first message of the two-step RACH procedure. Here, the parent base station 105-*e* may not receive the payload of the first message. In another example, the parent base station 105-*e* may assume that conditionally available resources or unavailable resources are available for a reception of the payload of the first message. Thus, the parent base station 105-*e* may receive the payload of the first message. In another example, the parent base station 105-*e* may conditionally exempt the payload portion of the first message. That is, if the parent base station 105-*e* successfully detects the preamble portion of the first message, the parent base station 105-*e* may assume that conditionally available resources or unavailable resources are available for a reception of the payload of the first message and may receive the payload of the first message.

If the parent base station 105-*e* does not receive the payload in the first message, the parent base station 105-*e* may fall back to a four-step RACH procedure with the IAB node 155-*e* and proceed to 625. Additionally, if the parent base station 105-*e* does receive the payload in the first message, the parent base station 105-*e* may continue the two-step RACH procedure and proceed to 645.

At 625, the parent base station 105-*e* may fall back into a four-step RACH procedure. For example, the parent base station 105-*e* may transmit a grant to the IAB node 155-*e*. The grant may be for a third message of the four-step RACH procedure. At 635, the IAB node 155-*e* may transmit the third message (e.g., the connection request) of the four-step RACH procedure to the parent base station 105-*e*. At 640, the parent base station 105-*e* may transmit a contention resolution message (e.g., Message 4) to the IAB node 155-*d*. For example, the contention resolution message may be an RAR message and, in a case of a successful RACH procedure, may indicate a successful completion of the RACH procedure. The IAB node 155-*e* may then proceed to 650.

At 645, the parent base station 105-*e* may transmit a contention resolution message (e.g., Message B) to the IAB node 155-*e* (e.g., based on receiving the payload of the first message of the two-step RACH procedure). In a case of a successful RACH procedure, the contention resolution message may indicate, to the IAB node 155-*e*, a successful completion of the RACH procedure. The IAB node 155-*e* may then proceed to 650.

At 650, the IAB node 155-*e* may establish a wireless backhaul link with the parent base station 105-*e* based on a successful completion of a RACH procedure with the parent base station 105-*e*. The IAB node 155-*e* may subsequently provide a backhaul connection (e.g., to one or more downstream wireless nodes such as a UE) based on the successful completion of the RACH procedure with the parent base station 105-*e*.

Figure 7:
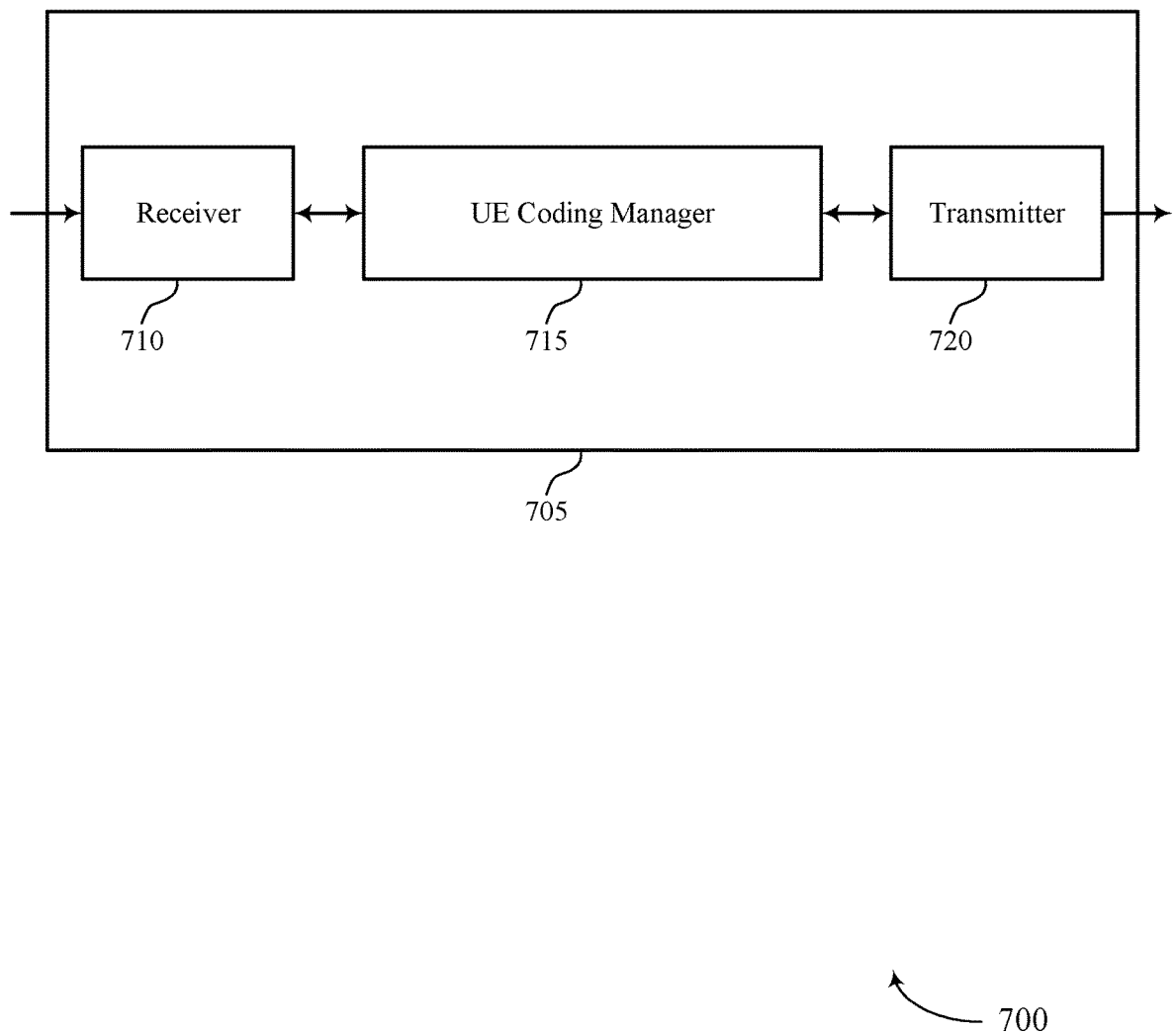
FIGS. 7 and 8 show block diagrams of devices that support two-step random access procedure for a backhaul node in accordance with aspects of the present disclosure.

FIG. 7 shows a block diagram 700 of a device 705 that supports two-step random access procedure for a backhaul node in accordance with aspects of the present disclosure.

The device 705 may be an example of aspects of an IAB node as described herein. The device 705 may include a receiver 710, an IAB coding manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to two-step random access procedure for a backhaul node). Information may be passed on to other components of the device 705. The receiver 710 may be an example of aspects of the transceiver 1020 described with reference to FIG. 10. The receiver 710 may utilize a single antenna or a set of antennas.

The IAB coding manager 715 may receive, from a parent base station, system information that is indicative of a first random access procedure configuration for a two-step random access procedure and a second random access procedure configuration different from the first random access procedure configuration, where the first wireless node is a wireless backhaul node to the parent base station, determine to use the first random access procedure configuration (e.g., for establishing a wireless backhaul connection with the parent base station), and perform the two-step random access procedure with the parent base station in accordance with the first random access procedure configuration. The IAB coding manager 715 may be an example of aspects of the IAB coding manager 1010 described herein.

The IAB coding manager 715 as described herein may be implemented to realize one or more potential advantages. One implementation may allow the device 705 to more efficiently perform RACH procedure with a parent node. For example, the device 705 may be configured to determine whether it may use a UE-specific RACH procedure or an IAB-specific RACH procedure. If the device 705 is able to use either RACH procedure, the device 705 may determine which RACH procedure to use to decrease latency associated with performing the RACH procedure.

Based on implementing the RACH procedure determination techniques as described herein, a processor of a UE 115 (e.g., controlling the receiver 710, the transmitter 720, or the transceiver 1020 as described with reference to FIG. 10 may increase reliability and efficiency in performing RACH procedures in IAB networks.

The IAB coding manager 715, or its sub-components, may be implemented in hardware, code (e.g., software or firmware) executed by a processor, or any combination thereof. If implemented in code executed by a processor, the functions of the IAB coding manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The IAB coding manager 715, or its sub-components, may be physically located at various positions, including being distributed such that portions of functions are implemented at different physical locations by one or more physical components. In some examples, the IAB coding manager 715, or its sub-components, may be a separate and distinct component in accordance with various aspects of the present disclosure. In some examples, the IAB coding manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
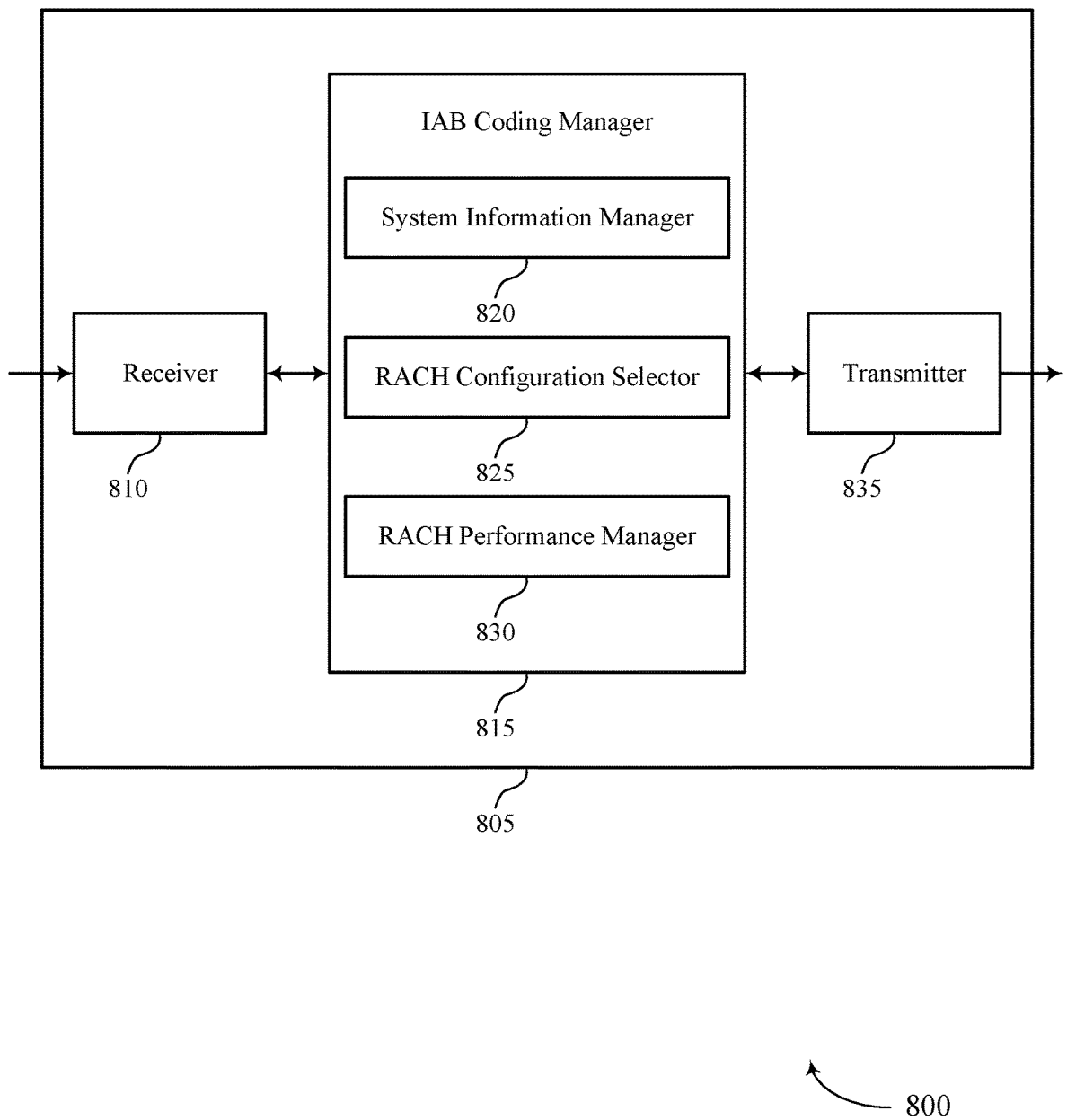

FIG. 8 shows a block diagram 800 of a device 805 that supports two-step random access procedure for a backhaul node in accordance with aspects of the present disclosure. The device 805 may be an example of aspects of a device 705, or an IAB node 155 as described herein. The device 805 may include a receiver 810, an IAB coding manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to two-step random access procedure for a backhaul node). Information may be passed on to other components of the device 805. The receiver 810 may be an example of aspects of the transceiver 1020 described with reference to FIG. 10. The receiver 810 may utilize a single antenna or a set of antennas.

The IAB coding manager 815 may be an example of aspects of the IAB coding manager 715 as described herein. The IAB coding manager 815 may include a system information manager 820, a RACH configuration selector 825, and a RACH performance manager 830. The IAB coding manager 815 may be an example of aspects of the IAB coding manager 1010 described herein.

The system information manager 820 may receive, from a parent base station, system information that is indicative of a first random access procedure configuration for a two-step random access procedure and a second random access procedure configuration different from the first random access procedure configuration, where the first wireless node is a wireless backhaul node to the parent base station.

The RACH configuration selector 825 may determine to use the first random access procedure configuration (e.g., for establishing a wireless backhaul connection with the parent base station).

The RACH performance manager 830 may perform the two-step random access procedure with the parent base station in accordance with the first random access procedure configuration.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
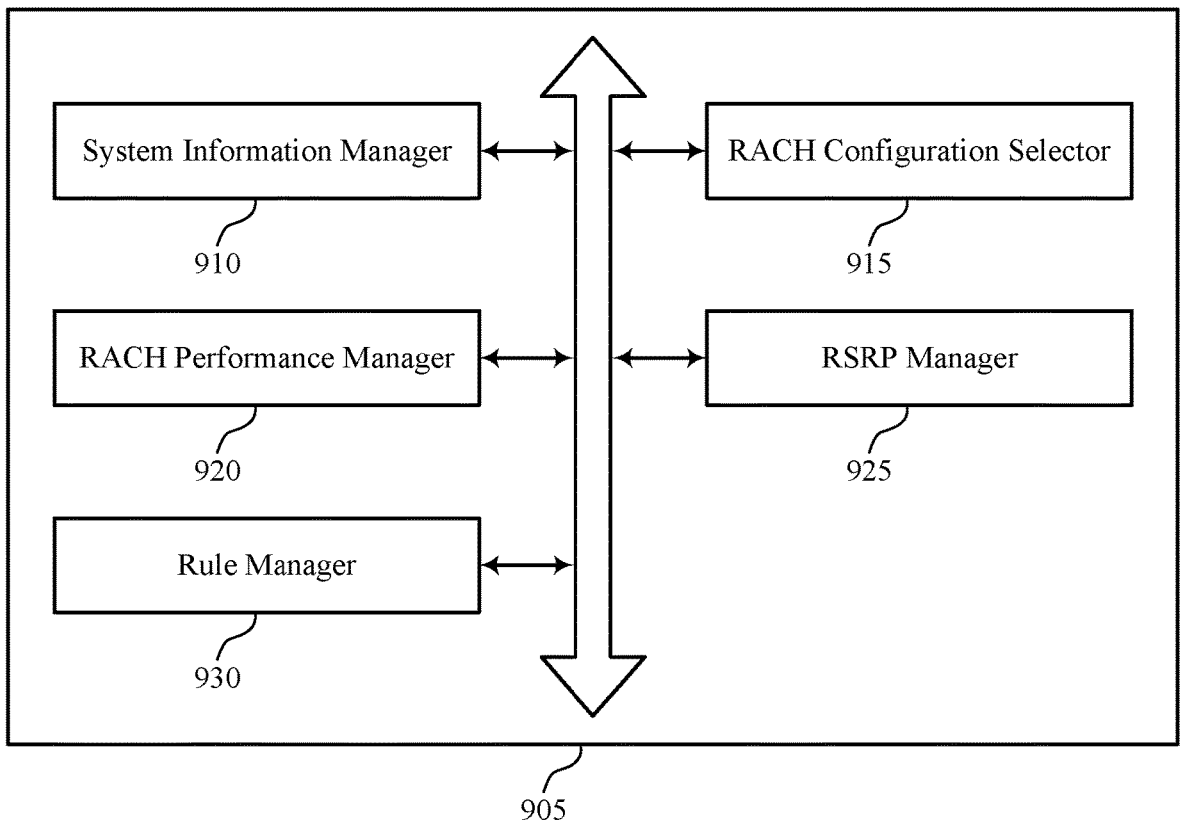
FIG. 9 shows a block diagram of a coding manager that supports two-step random access procedure for a backhaul node in accordance with aspects of the present disclosure.

FIG. 9 shows a block diagram 900 of an IAB coding manager 905 that supports two-step random access procedure for a backhaul node in accordance with aspects of the present disclosure. The IAB coding manager 905 may be an example of aspects of an IAB coding manager 715, an IAB coding manager 815, or an IAB coding manager 1010 described herein. The IAB coding manager 905 may include a system information manager 910, a RACH configuration selector 915, a RACH performance manager 920, an RSRP manager 925, and a rule manager 930. Each of these modules may communicate, directly or indirectly, with one another (e.g., via one or more buses).

The system information manager 910 may receive (e.g., at a first wireless node that may be an IAB node), from a parent base station, system information that is indicative of a first random access procedure configuration for a two-step random access procedure and a second random access procedure configuration different from the first random access procedure configuration, where the first wireless node is a wireless backhaul node to the parent base station. In some examples, the system information manager 910 may receive the first random access procedure configuration and the second random access procedure configuration as separate configurations within the system information. In some cases, the system information manager 910 may receive a common random access procedure configuration in the system information. In some instances, the system information manager 910 may receive configuration-specific parameters in the system information. In some examples, the system information manager 910 may determine the first random access procedure configuration and the second random access procedure configuration based on the common random access procedure configuration and the configuration-specific parameters.

The RACH configuration selector 915 may determine to use the first random access procedure configuration (e.g., for establishing a wireless backhaul connection with the parent base station). In some examples, the RACH configuration selector 915 may determine that the first random access procedure configuration is for a wireless backhaul-specific two-step random access procedure that is different from a UE-specific two-step random access procedure. In some examples, the RACH configuration selector 915 may select the first random access procedure configuration based on the first random access procedure configuration being for the wireless backhaul-specific two-step random access procedure.

In some cases, the RACH configuration selector 915 may determine whether to switch between use of the first random access procedure configuration and the second random access procedure configuration based on the comparing (e.g. of a determined RSRP to a threshold RSRP). In some examples, the RACH configuration selector 915 may use a wireless backhaul-specific threshold RSRP as the threshold RSRP based on the identification. In some cases, the RACH configuration selector 915 may use, based on the identification, either a wireless backhaul-specific threshold RSRP, a non-wireless backhaul-specific threshold RSRP, or infinity as the threshold RSRP. In some examples, the RACH configuration selector 915 may use, based on the identification, either a wireless backhaul-specific threshold RSRP, a non-wireless backhaul-specific threshold RSRP, zero, or infinity as the threshold RSRP.

In some examples, the RACH configuration selector 915 may identify that the first random access procedure configuration is for a wireless backhaul-specific two-step random access procedure and that the second random access procedure configuration is for a wireless backhaul-specific four-step random access procedure. In some cases, the RACH configuration selector 915 may identify that the first random access procedure configuration is for the two-step random access procedure and that the second random access procedure configuration is for a four-step random access procedure, and that only one of the first random access procedure configuration and the second random access procedure configuration is wireless backhaul-specific. In some examples, the RACH configuration selector 915 may identify that the first random access procedure configuration is for a non-wireless backhaul-specific two-step random access procedure and that the second random access procedure configuration is for a non-wireless backhaul-specific four-step random access procedure. In some examples, the RACH configuration selector 915 may identify that the first random access procedure configuration is for a wireless backhaul-specific two-step random access procedure, and that the second random access procedure configuration is for a UE-specific two-step random access procedure, where determining to use the first random access procedure configuration is based on a prohibition to use the UE-specific two-step random access procedure when the wireless backhaul-specific two-step random access procedure is configured.

The RACH performance manager 920 may perform the two-step random access procedure with the parent base station in accordance with the first random access procedure configuration. In some examples, the RACH performance manager 920 may transmit, during the two-step random access procedure, an indication to the parent base station that the first wireless node is the wireless backhaul node. In some cases, the RACH performance manager 920 may transmit, during the two-step random access procedure, an indication to the parent base station of a mobility of the first wireless node.

The RSRP manager 925 may determine an RSRP associated with communications with the parent base station. In some examples, the RSRP manager 925 may compare the determined RSRP with a threshold RSRP. In some cases, the RSRP manager 925 may identify that the determined RSRP exceeds the threshold RSRP based on the comparing, where determining to use the first random access procedure configuration is based on identifying that the determined RSRP exceeds the threshold RSRP.

The rule manager 930 may identify that the first random access procedure configuration is for a UE-specific two-step random access procedure, and that the second random access procedure configuration is for a wireless backhaul-specific two-step random access procedure, where determining to use the first random access procedure configuration is based on a rule allowing use of the UE-specific two-step random access procedure when the wireless backhaul-specific two-step random access procedure is configured. In some cases, the rule is that the UE-specific two-step random access procedure is usable when the wireless backhaul-specific two-step random access procedure is configured only when the first wireless node is a mobile wireless node. In some examples, the rule is that the UE-specific two-step random access procedure is usable when the wireless backhaul-specific two-step random access procedure is configured only when a variation of an RSRP associated with communications with the parent base station exceeds a threshold RSRP variation. In some instances, the rule is that the UE-specific two-step random access procedure is usable when the wireless backhaul-specific two-step random access procedure is configured only when a variation of a channel quality indicator associated with communications with the parent base station exceeds a threshold channel quality indicator variation.

In some cases, the rule is that the UE-specific two-step random access procedure is usable when the wireless backhaul-specific two-step random access procedure is configured only when the parent base station transmits signaling indicating the first random access procedure configuration for connecting with the parent base station via the UE-specific random access procedure. In some examples, the signaling indicating the first random access procedure configuration includes downlink control information, a media access control-control element, radio resource control signaling, or a combination thereof. In some instances, the rule is that the UE-specific two-step random access procedure is usable when the wireless backhaul-specific two-step random access procedure is configured only when a quantity of retransmissions of a first message of the wireless backhaul-specific two-step random access procedure exceeds a threshold quantity of retransmissions.

Figure 10:
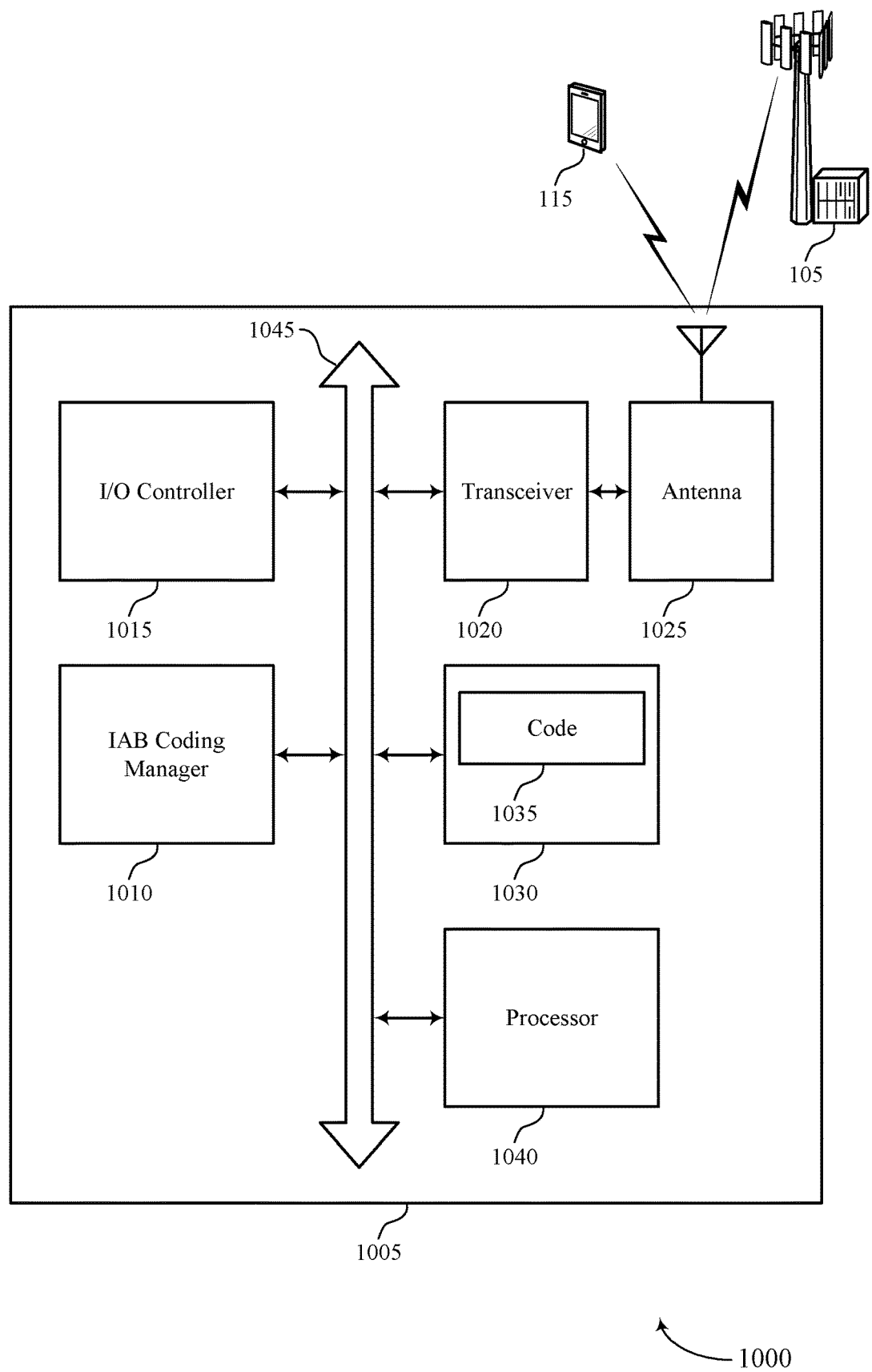
FIG. 10 shows a diagram of a system including a device that supports two-step random access procedure for a backhaul node in accordance with aspects of the present disclosure.

FIG. 10 shows a diagram of a system 1000 including a device 1005 that supports two-step random access procedure for a backhaul node in accordance with aspects of the present disclosure. The device 1005 may be an example of or include the components of device 705, device 805, or an IAB node 155 as described herein. The device 1005 may include components for bi-directional voice and data communications including components for transmitting and receiving communications, including an IAB coding manager 1010, an I/O controller 1015, a transceiver 1020, an antenna 1025, memory 1030, and a processor 1040. These components may be in electronic communication via one or more buses (e.g., bus 1045).

The IAB coding manager 1010 may receive, from a parent base station, system information that is indicative of a first random access procedure configuration for a two-step random access procedure and a second random access procedure configuration different from the first random access procedure configuration, where the first wireless node is a wireless backhaul node to the parent base station, determine to use the first random access procedure configuration (e.g., for establishing a wireless backhaul connection with the parent base station), and perform the two-step random access procedure with the parent base station in accordance with the first random access procedure configuration.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting two-step random access procedure for a backhaul node).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

By including or configuring the IAB coding manager 1010 in accordance with examples as described herein, the device 1005 may support techniques for a more robust random access procedure, configuring the device 1005, and other devices associated with the device 1005 with more efficient utilization of communication resources, improved coordination between devices, and improved utilization of processing capability.

Figure 11:
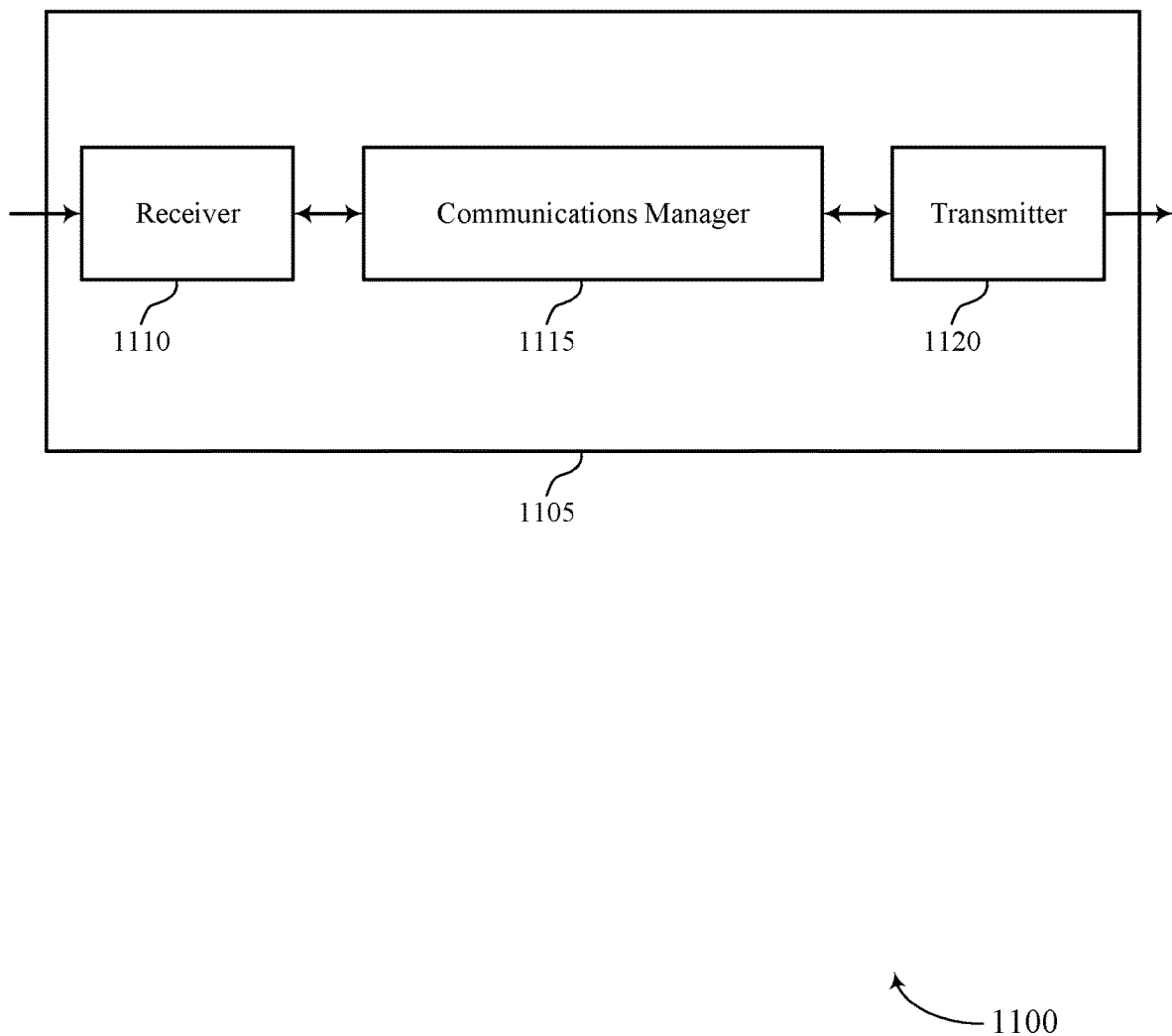
FIGS. 11 and 12 show block diagrams of devices that support two-step random access procedure for a backhaul node in accordance with aspects of the present disclosure.

FIG. 11 shows a block diagram 1100 of a device 1105 that supports two-step random access procedure for a backhaul node in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to two-step random access procedure for a backhaul node). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit, to a first wireless node, system information that is indicative of a first random access procedure configuration for a two-step random access procedure and a second random access procedure configuration different from the first random access procedure configuration, where the first wireless node is a wireless backhaul node to the parent base station, determine that the first random access procedure configuration is being used by the first wireless node (e.g., for establishing a wireless backhaul connection with the parent base station), and perform the two-step random access procedure with the first wireless node in accordance with the first random access procedure configuration. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

By including or configuring the communications manager 1115 in accordance with examples as described herein, the device 1105 (e.g., a processor controlling or otherwise coupled to the receiver 1110, the transmitter 1120, the communications manager 1115, or a combination thereof) may support techniques for performing a random access procedure in accordance with a two-step configuration or a device-specific configuration based on one or more factors, resulting in lowered communication latency, reduced power consumption, and more efficient utilization of communication resources.

Figure 12:
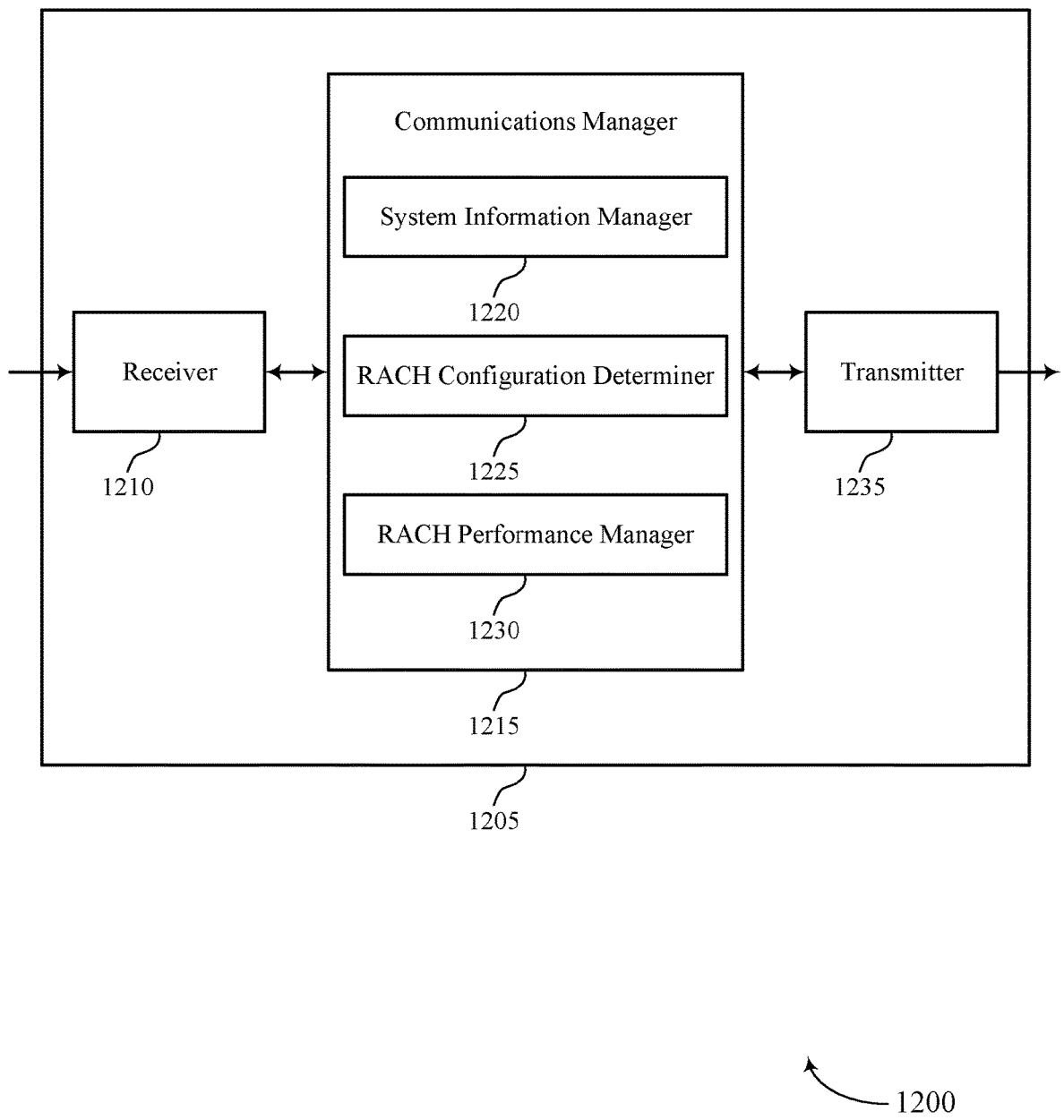

FIG. 12 shows a block diagram 1200 of a device 1205 that supports two-step random access procedure for a backhaul node in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to two-step random access procedure for a backhaul node). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a system information manager 1220, a RACH configuration determiner 1225, and a RACH performance manager 1230. The communications manager 1215 may be an example of aspects of the communications manager 1410 described herein.

The system information manager 1220 may transmit, to a first wireless node, system information that is indicative of a first random access procedure configuration for a two-step random access procedure and a second random access procedure configuration different from the first random access procedure configuration, where the first wireless node is a wireless backhaul node to the parent base station.

The RACH configuration determiner 1225 may determine that the first random access procedure configuration is being used by the first wireless node (e.g., for establishing a wireless backhaul connection with the parent base station).

The RACH performance manager 1230 may perform the two-step random access procedure with the first wireless node in accordance with the first random access procedure configuration.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
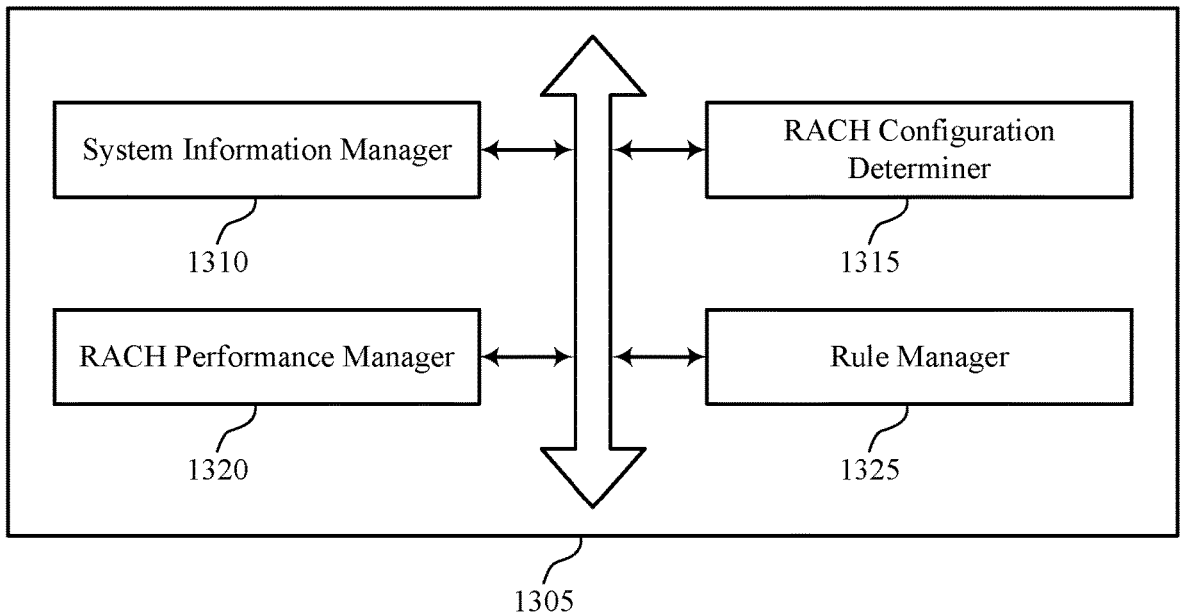
FIG. 13 shows a block diagram of a communications manager that supports two-step random access procedure for a backhaul node in accordance with aspects of the present disclosure.

FIG. 13 shows a block diagram 1300 of a communications manager 1305 that supports two-step random access procedure for a backhaul node in accordance with aspects of the present disclosure. The communications manager 1305 may be an example of aspects of a communications manager 1115, a communications manager 1215, or a communications manager 1410 described herein. The communications manager 1305 may include a system information manager 1310, a RACH configuration determiner 1315, a RACH performance manager 1320, and a rule manager 1325. Each of these modules may communicate, directly or indirectly, with one another (e.g., via one or more buses).

The system information manager 1310 may transmit, to a first wireless node, system information that is indicative of a first random access procedure configuration for a two-step random access procedure and a second random access procedure configuration different from the first random access procedure configuration, where the first wireless node is a wireless backhaul node to the parent base station. In some examples, the system information manager 1310 may transmit the first random access procedure configuration and the second random access procedure configuration as separate configurations within the system information. In some cases, the system information manager 1310 may transmit a common random access procedure configuration in the system information. In some instances, the system information manager 1310 may transmit configuration-specific parameters in the system information, where the first random access procedure configuration and the second random access procedure configuration are based on the common random access procedure configuration and the configuration-specific parameters. In some cases, the first wireless node is an integrated access backhaul node.

The RACH configuration determiner 1315 may determine that the first random access procedure configuration is being used by the first wireless node (e.g., for establishing a wireless backhaul connection with the parent base station).

The RACH performance manager 1320 may perform the two-step random access procedure with the first wireless node in accordance with the first random access procedure configuration. In some examples, the RACH performance manager 1320 may receive, from the first wireless node, a preamble of a first message of the two-step random access procedure by a first set of time and frequency resources that at least partially overlap with a second set of time and frequency resources that are conditionally available, unavailable, or a combination thereof. In some examples, the RACH performance manager 1320 may identify a first set of time and frequency resources associated with a transmission, by the first wireless node, of a preamble of a first message of the two-step random access procedure, the first set of time and frequency resources at partially overlapping with a second set of time and frequency resources that are conditionally available, unavailable, or a combination thereof and determine that the first set of time and frequency resources are available for receiving the preamble of the first message. Here, the RACH performance manager 1320 may receive, from the first wireless node, the preamble of the first message of the two-step random access procedure in the first set of time and frequency resources based on determining that the first set of time and frequency resources are available for receiving the preamble of the first message In some cases, the RACH performance manager 1320 may identify a third set of time and frequency resources associated with a transmission, by the first wireless node, of a payload of the first message of the two-step random access procedure, the third set of time and frequency resources at partially overlapping with the second set of time and frequency resources that are conditionally available, unavailable, or a combination thereof. The RACH performance manager 1320 may transmit a grant, to the first wireless node, for a third message of a four-step random access procedure based on receiving the preamble of the first message and identifying the third set of time and frequency resources. In some cases, the RACH performance manager 1320 may receive third message from the first wireless node based on transmitting the grant, where the third message comprises the payload of the first message of the two-step random access.

In some examples, the RACH performance manager 1320 may identify a third set of time and frequency resources associated with a transmission, by the first wireless node, of a payload of the first message of the two-step random access procedure, the third set of time and frequency resources at partially overlapping with the second set of time and frequency resources that are conditionally available, unavailable, or a combination thereof. In some cases, the RACH performance manager 1320 may determine that the third set of time and frequency resources are available for receiving the payload of the first message of the two-step random access procedure. In some instances, the RACH performance manager 1320 may receive, from the first wireless node, the payload of the first message of the two-step random access procedure by the third set of time and frequency resources. In some cases, the RACH performance manager 1320 may determine that the third set of time and frequency resources are available for receiving the payload of the first message of the two-step random access procedure is based on receiving the preamble of the first message of the two-step random access procedure from the first wireless node.

In some cases, the RACH performance manager 1320 may receive, during the two-step random access procedure, an indication from the first wireless node that the first wireless node is the wireless backhaul node. In some instances, the RACH performance manager 1320 may receive, during the two-step random access procedure, an indication from the first wireless node of a mobility of the first wireless node.

The rule manager 1325 may configure the first wireless node with a rule for using the first random access procedure configuration when the first random access procedure configuration is for a UE-specific two-step random access procedure and when the second random access procedure configuration is for a wireless backhaul-specific two-step random access procedure. In some cases, the rule is that the UE-specific two-step random access procedure is usable when the wireless backhaul-specific two-step random access procedure is configured only when the first wireless node is a mobile wireless node. In some examples, the rule is that the UE-specific two-step random access procedure is usable when the wireless backhaul-specific two-step random access procedure is configured only when a variation of an RSRP associated with communications with the parent base station exceeds a threshold RSRP variation. In some instances, the rule is that the UE-specific two-step random access procedure is usable when the wireless backhaul-specific two-step random access procedure is configured only when a variation of a channel quality indicator associated with communications with the parent base station exceeds a threshold channel quality indicator variation.

In some cases, the rule is that the UE-specific two-step random access procedure is usable when the wireless backhaul-specific two-step random access procedure is configured only when the parent base station transmits signaling indicating the first random access procedure configuration for connecting with the parent base station via the UE-specific random access procedure. In some examples, the signaling indicating the first random access procedure configuration includes downlink control information, a media access control-control element, radio resource control signaling, or a combination thereof. In some instances, the rule is that the UE-specific two-step random access procedure is usable when the wireless backhaul-specific two-step random access procedure is configured only when a quantity of retransmissions of a first message of the wireless backhaul-specific two-step random access procedure exceeds a threshold quantity of retransmissions.

Figure 14:
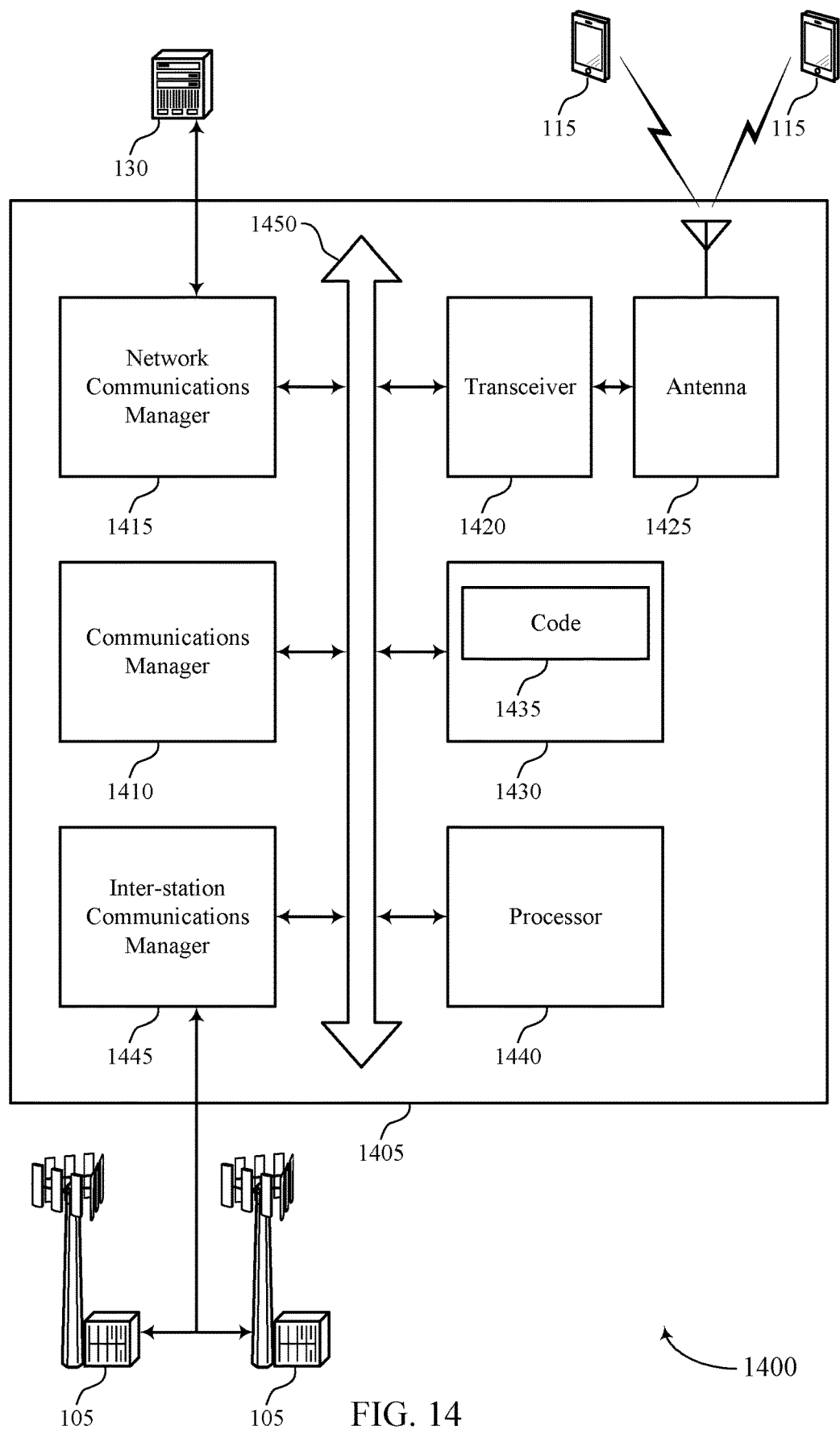
FIG. 14 shows a diagram of a system including a device that supports two-step random access procedure for a backhaul node in accordance with aspects of the present disclosure.

FIG. 14 shows a diagram of a system 1400 including a device 1405 that supports two-step random access procedure for a backhaul node in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit, to a first wireless node, system information that is indicative of a first random access procedure configuration for a two-step random access procedure and a second random access procedure configuration different from the first random access procedure configuration, where the first wireless node is a wireless backhaul node to the parent base station, determine that the first random access procedure configuration is being used by the first wireless node (e.g., for establishing a wireless backhaul connection with the parent base station), and perform the two-step random access procedure with the first wireless node in accordance with the first random access procedure configuration.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting two-step random access procedure for a backhaul node).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

By including or configuring the network communications manager 1415 in accordance with examples as described herein, the device 1405 may support techniques for a more robust random access procedure, configuring the device 1405, and other devices associated with the device 1405 with more efficient utilization of communication resources, improved coordination between devices, and improved utilization of processing capability.

Figure 15:
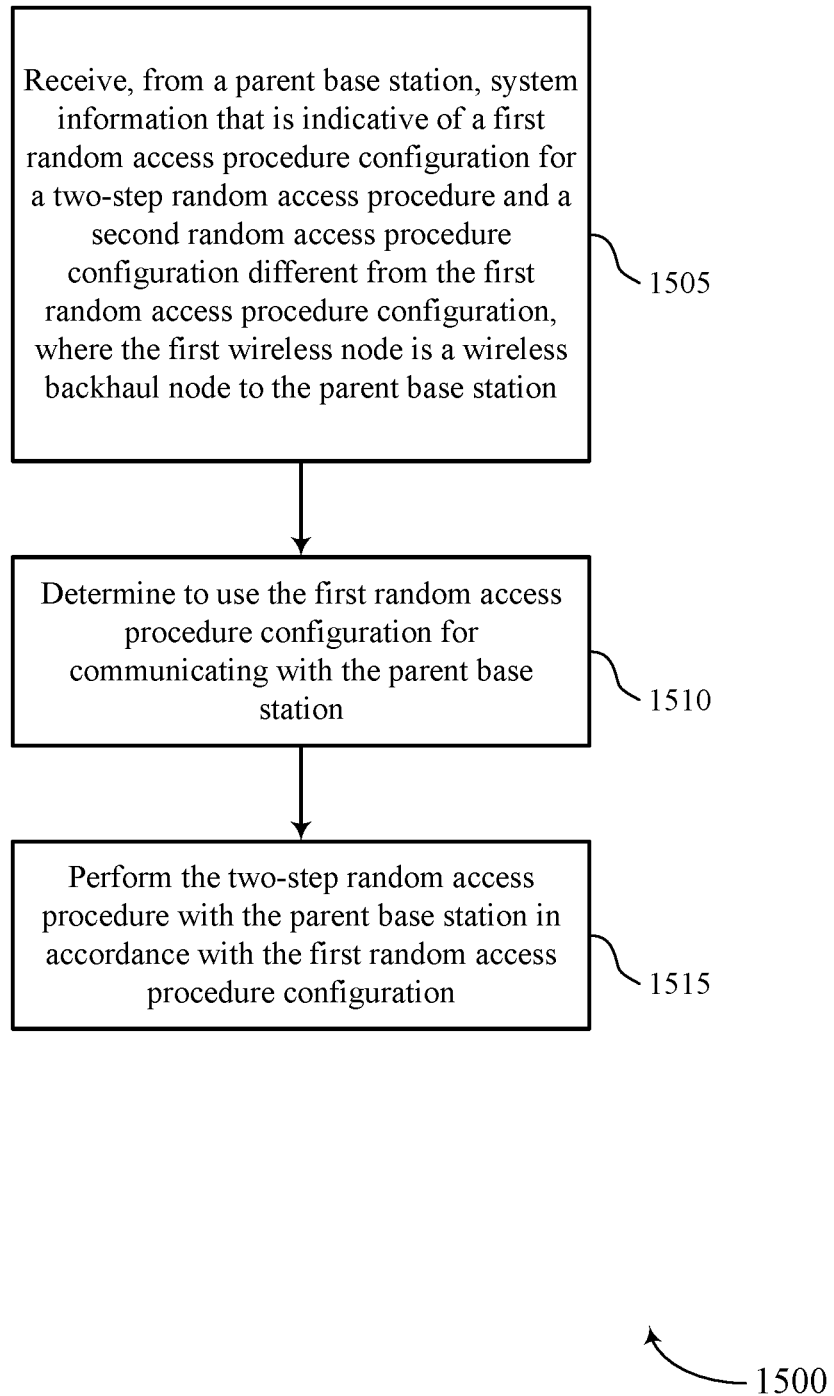
FIGS. 15 through 20 show flowcharts illustrating methods that support two-step random access procedure for a backhaul node in accordance with aspects of the present disclosure.

FIG. 15 shows a flowchart illustrating a method 1500 that supports two-step random access procedure for a backhaul node in accordance with aspects of the present disclosure. The operations of method 1500 may be implemented by a UE 115 or its components as described herein. For example, the operations of method 1500 may be performed by an IAB coding manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive, from a parent base station, system information that is indicative of a first random access procedure configuration for a two-step random access procedure and a second random access procedure configuration different from the first random access procedure configuration, where the first wireless node is a wireless backhaul node to the parent base station. The operations of 1505 may be performed according to the methods described herein. In some examples, aspects of the operations of 1505 may be performed by a system information manager as described with reference to FIGS. 7 through 10.

At 1510, the UE may determine to use the first random access procedure configuration for communicating with the parent base station (e.g., for establishing a wireless backhaul connection with the parent base station). The operations of 1510 may be performed according to the methods described herein. In some examples, aspects of the operations of 1510 may be performed by a RACH configuration selector as described with reference to FIGS. 7 through 10.

At 1515, the UE may perform the two-step random access procedure with the parent base station in accordance with the first random access procedure configuration. The operations of 1515 may be performed according to the methods described herein. In some examples, aspects of the operations of 1515 may be performed by a RACH performance manager as described with reference to FIGS. 7 through 10.

Figure 16:
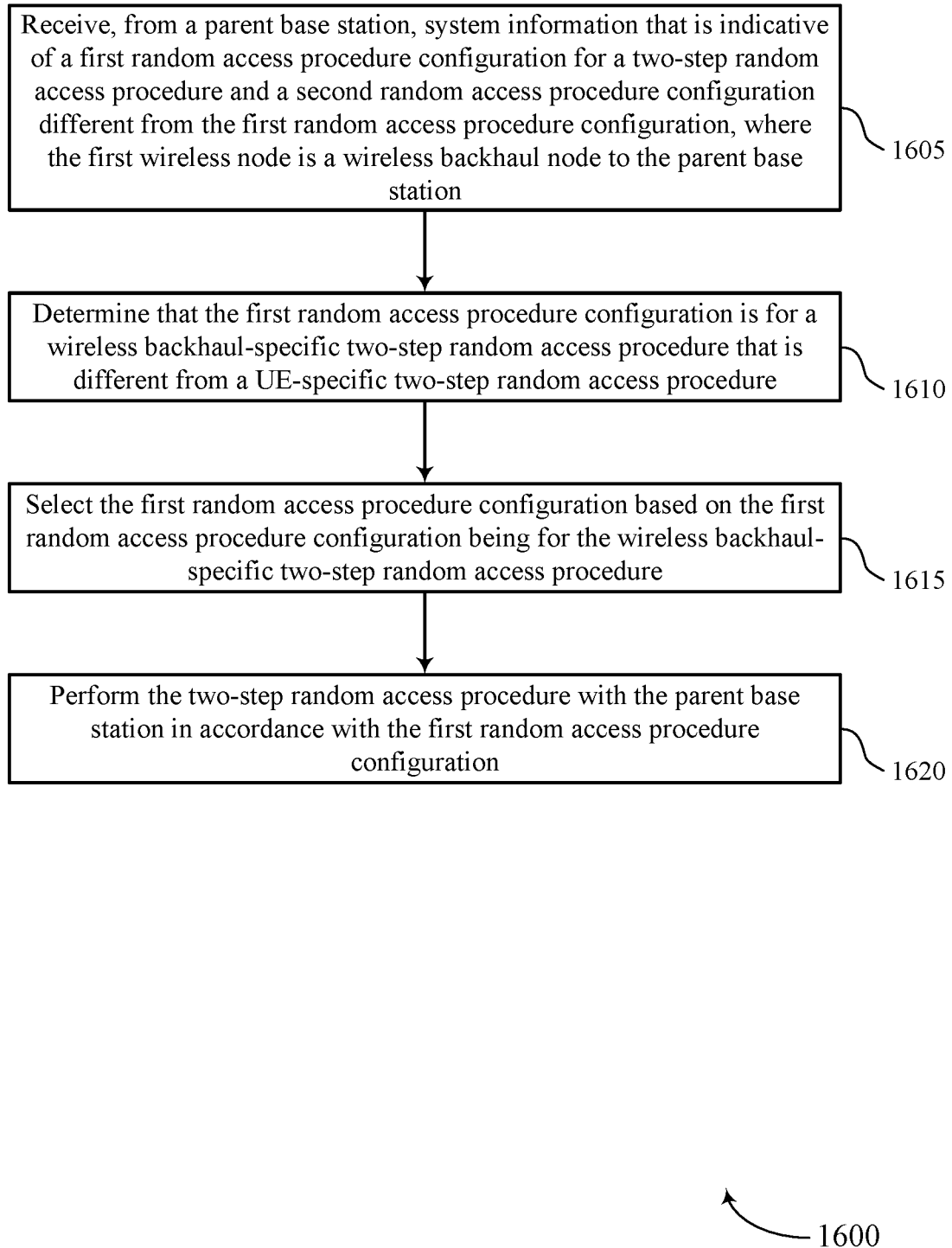

FIG. 16 shows a flowchart illustrating a method 1600 that supports two-step random access procedure for a backhaul node in accordance with aspects of the present disclosure. The operations of method 1600 may be implemented by a UE 115 or its components as described herein. For example, the operations of method 1600 may be performed by an IAB coding manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive, from a parent base station, system information that is indicative of a first random access procedure configuration for a two-step random access procedure and a second random access procedure configuration different from the first random access procedure configuration, where the first wireless node is a wireless backhaul node to the parent base station. The operations of 1605 may be performed according to the methods described herein. In some examples, aspects of the operations of 1605 may be performed by a system information manager as described with reference to FIGS. 7 through 10.

At 1610, the UE may determine that the first random access procedure configuration is for a wireless backhaul-specific two-step random access procedure that is different from a UE-specific two-step random access procedure. The operations of 1610 may be performed according to the methods described herein. In some examples, aspects of the operations of 1610 may be performed by a RACH configuration selector as described with reference to FIGS. 7 through 10.

At 1615, the UE may select the first random access procedure configuration based on the first random access procedure configuration being for the wireless backhaul-specific two-step random access procedure. The operations of 1615 may be performed according to the methods described herein. In some examples, aspects of the operations of 1615 may be performed by a RACH configuration selector as described with reference to FIGS. 7 through 10.

At 1620, the UE may perform the two-step random access procedure with the parent base station in accordance with the first random access procedure configuration. The operations of 1620 may be performed according to the methods described herein. In some examples, aspects of the operations of 1620 may be performed by a RACH performance manager as described with reference to FIGS. 7 through 10.

Figure 17:
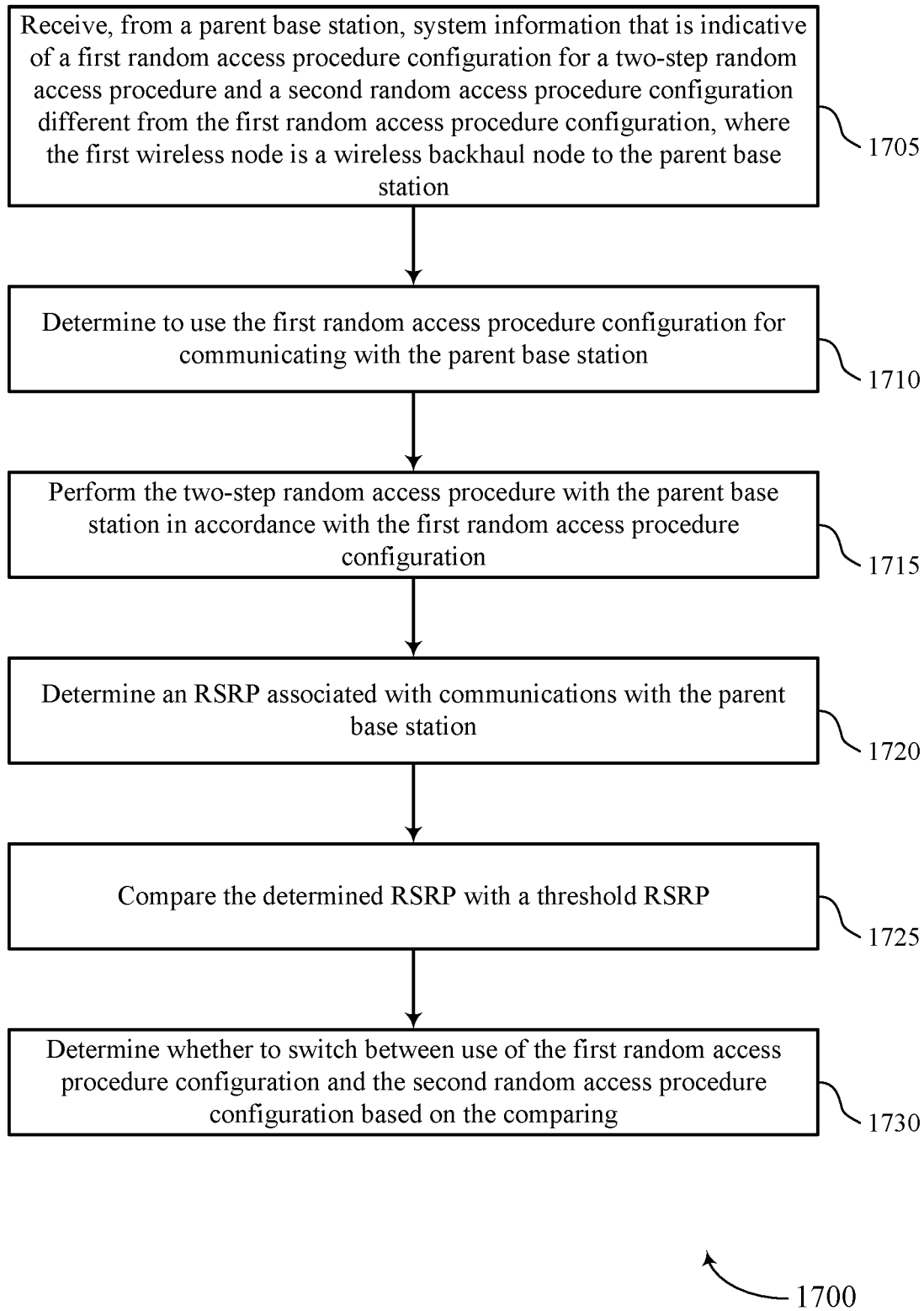

FIG. 17 shows a flowchart illustrating a method 1700 that supports two-step random access procedure for a backhaul node in accordance with aspects of the present disclosure. The operations of method 1700 may be implemented by a UE 115 or its components as described herein. For example, the operations of method 1700 may be performed by an IAB coding manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may receive, from a parent base station, system information that is indicative of a first random access procedure configuration for a two-step random access procedure and a second random access procedure configuration different from the first random access procedure configuration, where the first wireless node is a wireless backhaul node to the parent base station. The operations of 1705 may be performed according to the methods described herein. In some examples, aspects of the operations of 1705 may be performed by a system information manager as described with reference to FIGS. 7 through 10.

At 1710, the UE may determine to use the first random access procedure configuration for communicating with the parent base station (e.g., for establishing a wireless backhaul connection with the parent base station). The operations of 1710 may be performed according to the methods described herein. In some examples, aspects of the operations of 1710 may be performed by a RACH configuration selector as described with reference to FIGS. 7 through 10.

At 1715, the UE may perform the two-step random access procedure with the parent base station in accordance with the first random access procedure configuration. The operations of 1715 may be performed according to the methods described herein. In some examples, aspects of the operations of 1715 may be performed by a RACH performance manager as described with reference to FIGS. 7 through 10.

At 1720, the UE may determine an RSRP associated with communications with the parent base station. The operations of 1720 may be performed according to the methods described herein. In some examples, aspects of the operations of 1720 may be performed by an RSRP manager as described with reference to FIGS. 7 through 10.

At 1725, the UE may compare the determined RSRP with a threshold RSRP. The operations of 1725 may be performed according to the methods described herein. In some examples, aspects of the operations of 1725 may be performed by an RSRP manager as described with reference to FIGS. 7 through 10.

At 1730, the UE may determine whether to switch between use of the first random access procedure configuration and the second random access procedure configuration based on the comparing. The operations of 1730 may be performed according to the methods described herein. In some examples, aspects of the operations of 1730 may be performed by a RACH configuration selector as described with reference to FIGS. 7 through 10.

Figure 18:
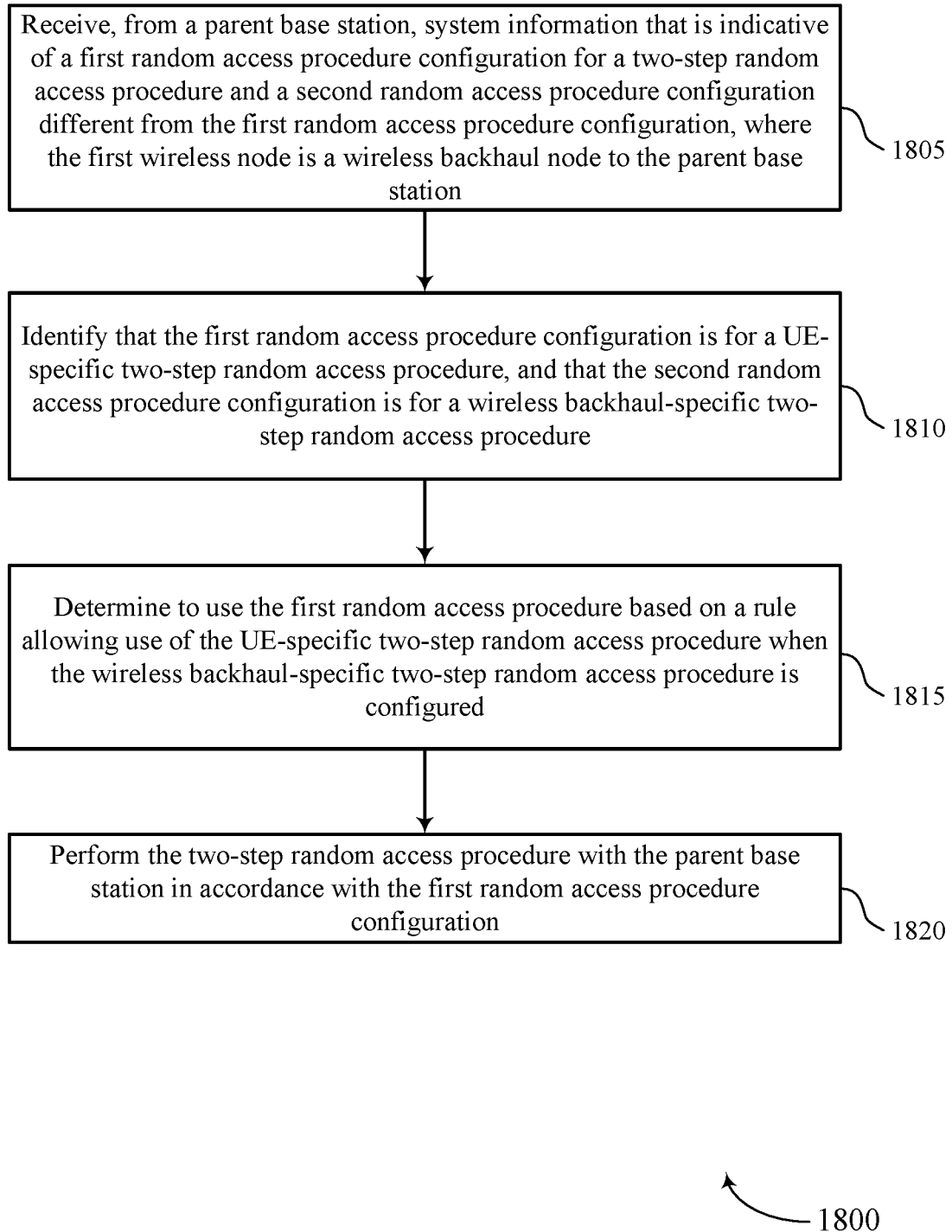

FIG. 18 shows a flowchart illustrating a method 1800 that supports two-step random access procedure for a backhaul node in accordance with aspects of the present disclosure. The operations of method 1800 may be implemented by a UE 115 or its components as described herein. For example, the operations of method 1800 may be performed by an IAB coding manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1805, the UE may receive, from a parent base station, system information that is indicative of a first random access procedure configuration for a two-step random access procedure and a second random access procedure configuration different from the first random access procedure configuration, where the first wireless node is a wireless backhaul node to the parent base station. The operations of 1805 may be performed according to the methods described herein. In some examples, aspects of the operations of 1805 may be performed by a system information manager as described with reference to FIGS. 7 through 10.

At 1810, the UE may identify that the first random access procedure configuration is for a UE-specific two-step random access procedure, and that the second random access procedure configuration is for a wireless backhaul-specific two-step random access procedure. The operations of 1810 may be performed according to the methods described herein. In some examples, aspects of the operations of 1810 may be performed by a rule manager as described with reference to FIGS. 7 through 10.

At 1815, the UE may determine to use the first random access procedure configuration (e.g., for establishing a wireless backhaul connection with the parent base station) based on a rule allowing use of the UE-specific two-step random access procedure when the wireless backhaul-specific two-step random access procedure is configured. The operations of 1815 may be performed according to the methods described herein. In some examples, aspects of the operations of 1815 may be performed by a RACH configuration selector as described with reference to FIGS. 7 through 10.

At 1820, the UE may perform the two-step random access procedure with the parent base station in accordance with the first random access procedure configuration. The operations of 1820 may be performed according to the methods described herein. In some examples, aspects of the operations of 1820 may be performed by a RACH performance manager as described with reference to FIGS. 7 through 10.

Figure 19:
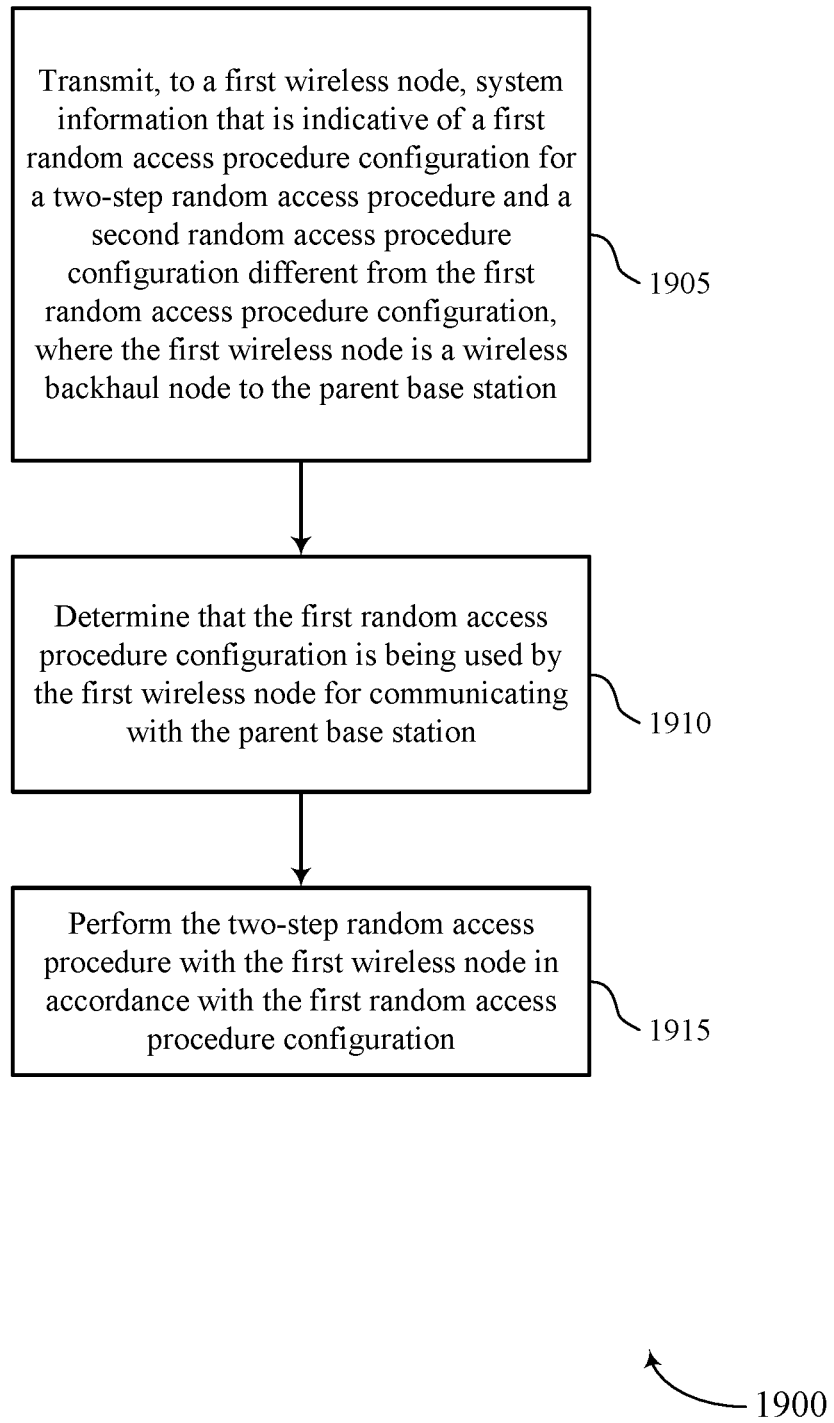

FIG. 19 shows a flowchart illustrating a method 1900 that supports two-step random access procedure for a backhaul node in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1905, the base station may transmit, to a first wireless node, system information that is indicative of a first random access procedure configuration for a two-step random access procedure and a second random access procedure configuration different from the first random access procedure configuration, where the first wireless node is a wireless backhaul node to the parent base station. The operations of 1905 may be performed according to the methods described herein. In some examples, aspects of the operations of 1905 may be performed by a system information manager as described with reference to FIGS. 11 through 14.

At 1910, the base station may determine that the first random access procedure configuration is being used by the first wireless node for communicating with the parent base station (e.g., for establishing a wireless backhaul connection with the parent base station). The operations of 1910 may be performed according to the methods described herein. In some examples, aspects of the operations of 1910 may be performed by a RACH configuration determiner as described with reference to FIGS. 11 through 14.

At 1915, the base station may perform the two-step random access procedure with the first wireless node in accordance with the first random access procedure configuration. The operations of 1915 may be performed according to the methods described herein. In some examples, aspects of the operations of 1915 may be performed by a RACH performance manager as described with reference to FIGS. 11 through 14.

Figure 20:
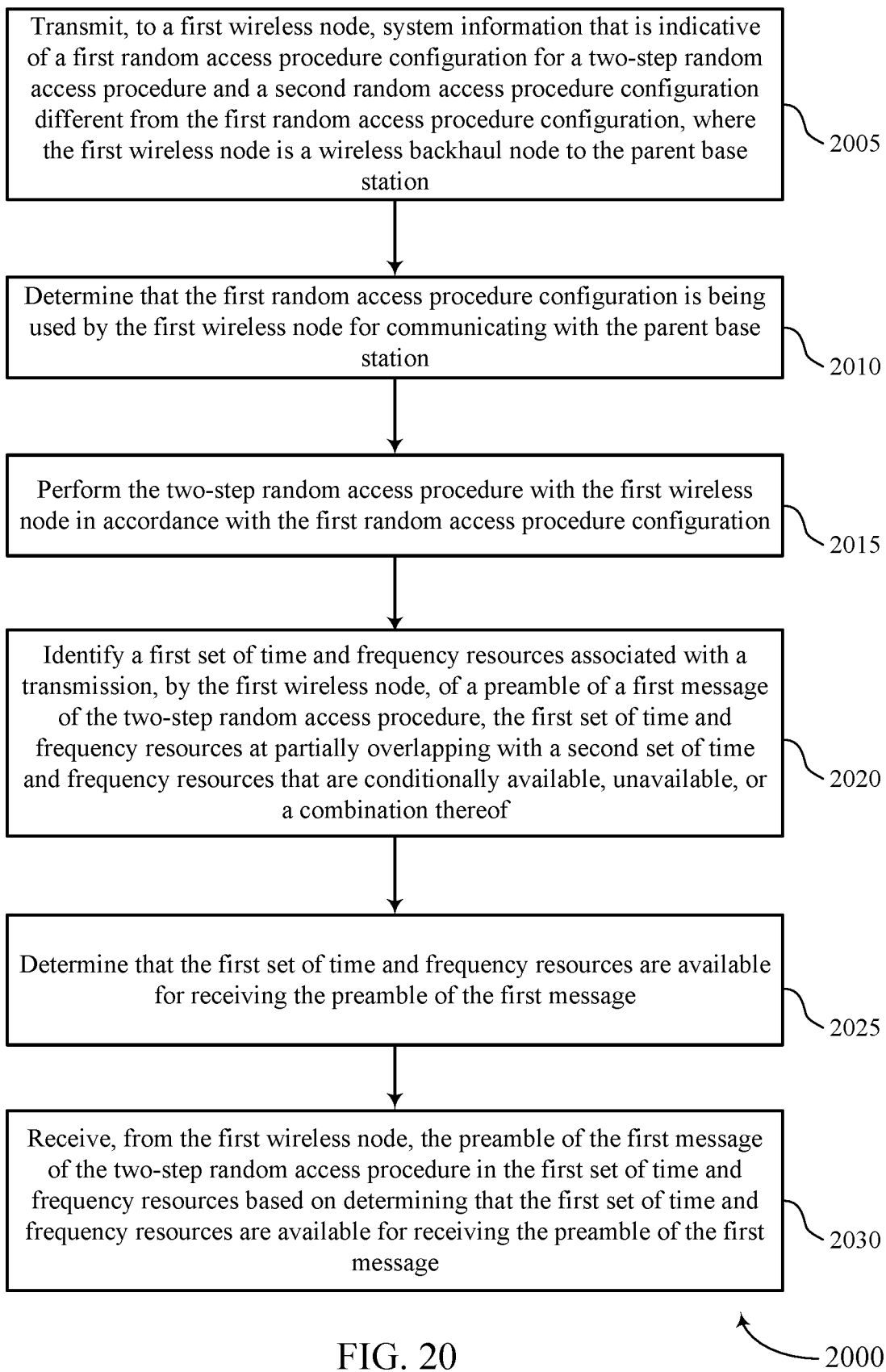

FIG. 20 shows a flowchart illustrating a method 2000 that supports two-step random access procedure for a backhaul node in accordance with aspects of the present disclosure. The operations of method 2000 may be implemented by a base station 105 or its components as described herein. For example, the operations of method 2000 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2005, the base station may transmit, to a first wireless node, system information that is indicative of a first random access procedure configuration for a two-step random access procedure and a second random access procedure configuration different from the first random access procedure configuration, where the first wireless node is a wireless backhaul node to the parent base station. The operations of 2005 may be performed according to the methods described herein. In some examples, aspects of the operations of 2005 may be performed by a system information manager as described with reference to FIGS. 11 through 14.

At 2010, the base station may determine that the first random access procedure configuration is being used by the first wireless node for communicating with the parent base station (e.g., for establishing a wireless backhaul connection with the parent base station). The operations of 2010 may be performed according to the methods described herein. In some examples, aspects of the operations of 2010 may be performed by a RACH configuration determiner as described with reference to FIGS. 11 through 14.

At 2015, the base station may perform the two-step random access procedure with the first wireless node in accordance with the first random access procedure configuration. The operations of 2015 may be performed according to the methods described herein. In some examples, aspects of the operations of 2015 may be performed by a RACH performance manager as described with reference to FIGS. 11 through 14.

At 2020, the base station may identify a first set of time and frequency resources associated with a transmission, by the first wireless node, of a preamble of a first message of the two-step random access procedure, the first set of time and frequency resources at partially overlapping with a second set of time and frequency resources that are conditionally available, unavailable, or a combination thereof. The operations of 2020 may be performed according to the methods described herein. In some examples, aspects of the operations of 2020 may be performed by a RACH performance manager as described with reference to FIGS. 11 through 14.

At 2025, the base station may determine that the first set of time and frequency resources are available for receiving the preamble of the first message. The operations of 2025 may be performed according to the methods described herein. In some examples, aspects of the operations of 2025 may be performed by a RACH performance manager as described with reference to FIGS. 11 through 14.

At 2030, the base station may receive, from the first wireless node, the preamble of the first message of the two-step random access procedure in the first set of time and frequency resources based on determining that the first set of time and frequency resources are available for receiving the preamble of the first message. The operations of 2030 may be performed according to the methods described herein. In some examples, aspects of the operations of 2030 may be performed by a RACH performance manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a first wireless node, comprising: receiving, from a parent base station, system information that is indicative of a first random access procedure configuration for a two-step random access procedure and a second random access procedure configuration different from the first random access procedure configuration, wherein the first wireless node is a wireless backhaul node to the parent base station; determining to use the first random access procedure configuration for communicating with the parent base station; and performing the two-step random access procedure with the parent base station in accordance with the first random access procedure configuration.

Aspect 2: The method of aspect 1, wherein determining to use the first random access procedure configuration comprises: determining that the first random access procedure configuration is for a wireless backhaul-specific two-step random access procedure that is different from a UE-specific two-step random access procedure; and selecting the first random access procedure configuration based at least in part on the first random access procedure configuration being for the wireless backhaul-specific two-step random access procedure.

Aspect 3: The method of any of aspects 1 through 2, wherein receiving system information that is indicative of the first random access procedure configuration and the second random access procedure configuration further comprises: receiving the first random access procedure configuration and the second random access procedure configuration as separate configurations within the system information.

Aspect 4: The method of any of aspects 1 through 3, wherein receiving system information that is indicative of the first random access procedure configuration and the second random access procedure configuration further comprises: receiving a common random access procedure configuration in the system information; receiving configuration-specific parameters in the system information; and determining the first random access procedure configuration and the second random access procedure configuration based at least in part on the common random access procedure configuration and the configuration-specific parameters.

Aspect 5: The method of any of aspects 1 through 4, further comprising: determining a reference signal receive power associated with communications with the parent base station; comparing the determined reference signal receive power with a threshold reference signal receive power; and determining whether to switch between use of the first random access procedure configuration and the second random access procedure configuration based at least in part on the comparing.

Aspect 6: The method of aspect 5, further comprising: identifying that the determined reference signal receive power exceeds the threshold reference signal receive power based at least in part on the comparing, wherein determining to use the first random access procedure configuration is based at least in part on identifying that the determined reference signal receive power exceeds the threshold reference signal receive power.

Aspect 7: The method of any of aspects 5 through 6, wherein determining whether to switch between use of the first random access procedure configuration and the second random access procedure configuration further comprises: identifying that the first random access procedure configuration is for a wireless backhaul-specific two-step random access procedure and that the second random access procedure configuration is for a wireless backhaul-specific four-step random access procedure; and using a wireless backhaul-specific threshold reference signal receive power as the threshold reference signal receive power based on the identification.

Aspect 8: The method of any of aspects 5 through 7, wherein determining whether to switch between use of the first random access procedure configuration and the second random access procedure configuration further comprises: identifying that the first random access procedure configuration is for the two-step random access procedure and that the second random access procedure configuration is for a four-step random access procedure, and that only one of the first random access procedure configuration and the second random access procedure configuration is wireless backhaul-specific; and using, based on the identification, either a wireless backhaul-specific threshold reference signal receive power, a non-wireless backhaul-specific threshold reference signal receive power, or infinity as the threshold reference signal receive power.

Aspect 9: The method of any of aspects 5 through 8, wherein determining whether to switch between use of the first random access procedure configuration and the second random access procedure configuration further comprises: identifying that the first random access procedure configuration is for a non-wireless backhaul-specific two-step random access procedure and that the second random access procedure configuration is for a non-wireless backhaul-specific four-step random access procedure; and using, based on the identification, either a wireless backhaul-specific threshold reference signal receive power, a non-wireless backhaul-specific threshold reference signal receive power, zero, or infinity as the threshold reference signal receive power.

Aspect 10: The method of any of aspects 1 through 9, further comprising: identifying that the first random access procedure configuration is for a wireless backhaul-specific two-step random access procedure, and that the second random access procedure configuration is for a UE-specific two-step random access procedure, wherein determining to use the first random access procedure configuration is based at least in part on a prohibition to use the UE-specific two-step random access procedure when the wireless backhaul-specific two-step random access procedure is configured.

Aspect 11: The method of any of aspects 1 through 10, further comprising: identifying that the first random access procedure configuration is for a UE-specific two-step random access procedure, and that the second random access procedure configuration is for a wireless backhaul-specific two-step random access procedure, wherein determining to use the first random access procedure configuration is based at least in part on a rule allowing use of the UE-specific two-step random access procedure when the wireless backhaul-specific two-step random access procedure is configured.

Aspect 12: The method of aspect 11, wherein the rule is that the UE-specific two-step random access procedure is usable when the wireless backhaul-specific two-step random access procedure is configured only when the first wireless node is a mobile wireless node.

Aspect 13: The method of any of aspects 11 through 12, wherein the rule is that the UE-specific two-step random access procedure is usable when the wireless backhaul-specific two-step random access procedure is configured only when a variation of a reference signal receive power associated with communications with the parent base station exceeds a threshold reference signal receive power variation.

Aspect 14: The method of any of aspects 11 through 13, wherein the rule is that the UE-specific two-step random access procedure is usable when the wireless backhaul-specific two-step random access procedure is configured only when a variation of a channel quality indicator associated with communications with the parent base station exceeds a threshold channel quality indicator variation.

Aspect 15: The method of any of aspects 11 through 14, wherein the rule is that the UE-specific two-step random access procedure is usable when the wireless backhaul-specific two-step random access procedure is configured only when the parent base station transmits signaling indicating the first random access procedure configuration for connecting with the parent base station via the UE-specific random access procedure.

Aspect 16: The method of aspect 15, wherein the signaling indicating the first random access procedure configuration comprises downlink control information, a media access control-control element, radio resource control signaling, or a combination thereof.

Aspect 17: The method of any of aspects 11 through 16, wherein the rule is that the UE-specific two-step random access procedure is usable when the wireless backhaul-specific two-step random access procedure is configured only when a quantity of retransmissions of a first message of the wireless backhaul-specific two-step random access procedure exceeds a threshold quantity of retransmissions.

Aspect 18: The method of any of aspects 1 through 17, wherein performing the two-step random access procedure further comprises: transmitting, during the two-step random access procedure, an indication to the parent base station that the first wireless node is the wireless backhaul node.

Aspect 19: The method of any of aspects 1 through 18, wherein performing the two-step random access procedure further comprises: transmitting, during the two-step random access procedure, an indication to the parent base station of a mobility of the first wireless node.

Aspect 20: The method of any of aspects 1 through 19, wherein the first wireless node is an integrated access backhaul node.

Aspect 21: A method for wireless communication at a parent base station, comprising: transmitting, to a first wireless node, system information that is indicative of a first random access procedure configuration for a two-step random access procedure and a second random access procedure configuration different from the first random access procedure configuration, wherein the first wireless node is a wireless backhaul node to the parent base station; determining that the first random access procedure configuration is being used by the first wireless node for communicating with the parent base station; and performing the two-step random access procedure with the first wireless node in accordance with the first random access procedure configuration.

Aspect 22: The method of aspect 21, wherein performing the two-step random access procedure further comprises: identifying a first set of time and frequency resources associated with a transmission, by the first wireless node, of a preamble of a first message of the two-step random access procedure, the first set of time and frequency resources at partially overlapping with a second set of time and frequency resources that are conditionally available, unavailable, or a combination thereof; determining that the first set of time and frequency resources are available for receiving the preamble of the first message; and receiving, from the first wireless node, the preamble of the first message of the two-step random access procedure in the first set of time and frequency resources based at least in part on determining that the first set of time and frequency resources are available for receiving the preamble of the first message.

Aspect 23: The method of aspect 22, further comprising: identifying a third set of time and frequency resources associated with a transmission, by the first wireless node, of a payload of the first message of the two-step random access procedure, the third set of time and frequency resources at partially overlapping with the second set of time and frequency resources that are conditionally available, unavailable, or a combination thereof; transmitting a grant, to the first wireless node, for a third message of a four-step random access procedure based at least in part on receiving the preamble of the first message and identifying the third set of time and frequency resources; and receiving the third message from the first wireless node based at least in part on transmitting the grant, wherein the third message comprises the payload of the first message of the two-step random access procedure.

Aspect 24: The method of any of aspects 22 through 23, wherein performing the two-step random access procedure further comprises: identifying a third set of time and frequency resources associated with a transmission, by the first wireless node, of a payload of the first message of the two-step random access procedure, the third set of time and frequency resources at partially overlapping with the second set of time and frequency resources that are conditionally available, unavailable, or a combination thereof; determining that the third set of time and frequency resources are available for receiving the payload of the first message of the two-step random access procedure; and receiving, from the first wireless node, the payload of the first message of the two-step random access procedure by the third set of time and frequency resources.

Aspect 25: The method of aspect 24, wherein determining that the third set of time and frequency resources are available for receiving the payload of the first message of the two-step random access procedure is based at least in part on receiving the preamble of the first message of the two-step random access procedure from the first wireless node.

Aspect 26: The method of any of aspects 21 through 25, wherein transmitting system information that is indicative of the first random access procedure configuration and the second random access procedure configuration further comprises: transmitting the first random access procedure configuration and the second random access procedure configuration as separate configurations within the system information.

Aspect 27: The method of any of aspects 21 through 26, wherein transmitting system information that is indicative of the first random access procedure configuration and the second random access procedure configuration further comprises: transmitting a common random access procedure configuration in the system information; and transmitting configuration-specific parameters in the system information, wherein the first random access procedure configuration and the second random access procedure configuration are based at least in part on the common random access procedure configuration and the configuration-specific parameters.

Aspect 28: The method of any of aspects 21 through 27, further comprising: configuring the first wireless node with a rule for using the first random access procedure configuration when the first random access procedure configuration is for a UE-specific two-step random access procedure and when the second random access procedure configuration is for a wireless backhaul-specific two-step random access procedure.

Aspect 29: The method of aspect 28, wherein the rule is that the UE-specific two-step random access procedure is usable when the wireless backhaul-specific two-step random access procedure is configured only when the first wireless node is a mobile wireless node.

Aspect 30: The method of any of aspects 28 through 29, wherein the rule is that the UE-specific two-step random access procedure is usable when the wireless backhaul-specific two-step random access procedure is configured only when a variation of a reference signal receive power associated with communications with the parent base station exceeds a threshold reference signal receive power variation.

Aspect 31: The method of any of aspects 28 through 30, wherein the rule is that the UE-specific two-step random access procedure is usable when the wireless backhaul-specific two-step random access procedure is configured only when a variation of a channel quality indicator associated with communications with the parent base station exceeds a threshold channel quality indicator variation.

Aspect 32: The method of any of aspects 28 through 31, wherein the rule is that the UE-specific two-step random access procedure is usable when the wireless backhaul-specific two-step random access procedure is configured only when the parent base station transmits signaling indicating the first random access procedure configuration for connecting with the parent base station via the UE-specific random access procedure.

Aspect 33: The method of aspect 32, wherein the signaling indicating the first random access procedure configuration comprises downlink control information, a media access control-control element, radio resource control signaling, or a combination thereof.

Aspect 34: The method of any of aspects 28 through 33, wherein the rule is that the UE-specific two-step random access procedure is usable when the wireless backhaul-specific two-step random access procedure is configured only when a quantity of retransmissions of a first message of the wireless backhaul-specific two-step random access procedure exceeds a threshold quantity of retransmissions.

Aspect 35: The method of any of aspects 21 through 34, wherein performing the two-step random access procedure further comprises: receiving, during the two-step random access procedure, an indication from the first wireless node that the first wireless node is the wireless backhaul node.

Aspect 36: The method of any of aspects 21 through 35, wherein performing the two-step random access procedure further comprises: receiving, during the two-step random access procedure, an indication from the first wireless node of a mobility of the first wireless node.

Aspect 37: The method of any of aspects 21 through 36, wherein the first wireless node is an integrated access backhaul node.

Aspect 38: An apparatus for wireless communication at a first wireless node, comprising a processor; memory coupled with the processor; and instructions stored in the memory and executable by the processor to cause the apparatus to perform a method of any of aspects 1 through 20.

Aspect 39: An apparatus for wireless communication at a first wireless node, comprising at least one means for performing a method of any of aspects 1 through 20.

Aspect 40: A non-transitory computer-readable medium storing code for wireless communication at a first wireless node, the code comprising instructions executable by a processor to perform a method of any of aspects 1 through 20.

Aspect 41: An apparatus for wireless communication at a parent base station, comprising a processor; memory coupled with the processor; and instructions stored in the memory and executable by the processor to cause the apparatus to perform a method of any of aspects 21 through 37.

Aspect 42: An apparatus for wireless communication at a parent base station, comprising at least one means for performing a method of any of aspects 21 through 37.

Aspect 43: A non-transitory computer-readable medium storing code for wireless communication at a parent base station, the code comprising instructions executable by a processor to perform a method of any of aspects 21 through 37.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first wireless node, comprising:
    receiving, from a parent network entity, system information that is indicative of both a first random access procedure configuration for a two-step random access procedure and a second random access procedure configuration for a random access procedure which has more than two steps, wherein the first wireless node is a wireless backhaul node to the parent network entity;
    determining to use the first random access procedure configuration instead of the second random access procedure configuration for communicating with the parent network entity; and
    performing the two-step random access procedure with the parent network entity in accordance with the first random access procedure configuration.

2. The method of claim 1, wherein determining to use the first random access procedure configuration comprises:
    determining that the first random access procedure configuration is for a wireless backhaul-specific two-step random access procedure that is different from a user equipment (UE)-specific two-step random access procedure; and
    selecting the first random access procedure configuration based at least in part on the first random access procedure configuration being for the wireless backhaul-specific two-step random access procedure.

3. The method of claim 1, wherein receiving system information that is indicative of both the first random access procedure configuration and the second random access procedure configuration further comprises:
    receiving the first random access procedure configuration and the second random access procedure configuration as separate configurations within the system information.

4. The method of claim 1, wherein receiving system information that is indicative of both the first random access procedure configuration and the second random access procedure configuration further comprises:
    receiving a common random access procedure configuration in the system information;
    receiving configuration-specific parameters in the system information; and
    determining the first random access procedure configuration and the second random access procedure configuration based at least in part on the common random access procedure configuration and the configuration-specific parameters.

5. The method of claim 1, further comprising:
    determining a reference signal receive power associated with communications with the parent network entity;
    comparing the determined reference signal receive power with a threshold reference signal receive power; and
    determining whether to switch between use of the first random access procedure configuration and the second random access procedure configuration based at least in part on the comparing.

6. The method of claim 5, further comprising:
    identifying that the determined reference signal receive power exceeds the threshold reference signal receive power based at least in part on the comparing, wherein determining to use the first random access procedure configuration is based at least in part on identifying that the determined reference signal receive power exceeds the threshold reference signal receive power.

7. The method of claim 5, wherein determining whether to switch between use of the first random access procedure configuration and the second random access procedure configuration further comprises:
    identifying that the first random access procedure configuration is for a wireless backhaul-specific two-step random access procedure and that the second random access procedure configuration is for a wireless backhaul-specific four-step random access procedure; and using a wireless backhaul-specific threshold reference signal receive power as the threshold reference signal receive power based on the identification.

8. The method of claim 5, wherein determining whether to switch between use of the first random access procedure configuration and the second random access procedure configuration further comprises:
identifying that the first random access procedure configuration is for the two-step random access procedure and that the second random access procedure configuration is for a four-step random access procedure, and that only one of the first random access procedure configuration and the second random access procedure configuration is wireless backhaul-specific; and
using, based on the identification, either a wireless backhaul-specific threshold reference signal receive power, a non-wireless backhaul-specific threshold reference signal receive power, or infinity as the threshold reference signal receive power.

9. The method of claim 5, wherein determining whether to switch between use of the first random access procedure configuration and the second random access procedure configuration further comprises:
identifying that the first random access procedure configuration is for a non-wireless backhaul-specific two-step random access procedure and that the second random access procedure configuration is for a non-wireless backhaul-specific four-step random access procedure; and
using, based on the identification, either a wireless backhaul-specific threshold reference signal receive power, a non-wireless backhaul-specific threshold reference signal receive power, zero, or infinity as the threshold reference signal receive power.

10. The method of claim 1, further comprising:
identifying that the first random access procedure configuration is for a wireless backhaul-specific two-step random access procedure, and that the second random access procedure configuration is for a user equipment (UE)-specific random access procedure, wherein determining to use the first random access procedure configuration is based at least in part on a prohibition to use the UE-specific random access procedure when the wireless backhaul-specific two-step random access procedure is configured.

11. The method of claim 1, further comprising:
identifying that the first random access procedure configuration is for a user equipment (UE)-specific two-step random access procedure, wherein determining to use the first random access procedure configuration is based at least in part on a rule allowing use of the UE-specific two-step random access procedure when a wireless backhaul-specific two-step random access procedure is configured.

12. The method of claim 11, wherein the rule is that the UE-specific two-step random access procedure is usable when the wireless backhaul-specific two-step random access procedure is configured only when the first wireless node is a mobile wireless node.

13. The method of claim 11, wherein the rule is that the UE-specific two-step random access procedure is usable when the wireless backhaul-specific two-step random access procedure is configured only when a variation of a reference signal receive power associated with communications with the parent network entity exceeds a threshold reference signal receive power variation.

14. The method of claim 11, wherein the rule is that the UE-specific two-step random access procedure is usable when the wireless backhaul-specific two-step random access procedure is configured only when a variation of a channel quality indicator associated with communications with the parent network entity exceeds a threshold channel quality indicator variation.

15. The method of claim 11, wherein the rule is that the UE-specific two-step random access procedure is usable when the wireless backhaul-specific two-step random access procedure is configured only when the parent network entity transmits signaling indicating the first random access procedure configuration for connecting with the parent network entity via the UE-specific random access procedure.

16. The method of claim 15, wherein the signaling indicating the first random access procedure configuration comprises downlink control information, a media access control-control element, radio resource control signaling, or a combination thereof.

17. The method of claim 11, wherein the rule is that the UE-specific two-step random access procedure is usable when the wireless backhaul-specific two-step random access procedure is configured only when a quantity of retransmissions of a first message of the wireless backhaul-specific two-step random access procedure exceeds a threshold quantity of retransmissions.

18. The method of claim 1, wherein performing the two-step random access procedure further comprises:
transmitting, during the two-step random access procedure, an indication to the parent network entity that the first wireless node is the wireless backhaul node.

19. The method of claim 1, wherein performing the two-step random access procedure further comprises:
transmitting, during the two-step random access procedure, an indication to the parent network entity of a mobility of the first wireless node.

20. The method of claim 1, wherein the first wireless node is an integrated access backhaul node.

21. A method for wireless communication at a parent network entity, comprising:
transmitting, to a first wireless node, system information that is indicative of both a first random access procedure configuration for a two-step random access procedure and a second random access procedure configuration for a random access procedure which has more than two steps, wherein the first wireless node is a wireless backhaul node to the parent network entity;
determining that the first random access procedure configuration instead of the second random access procedure configuration is being used by the first wireless node for communicating with the parent network entity; and
performing the two-step random access procedure with the first wireless node in accordance with the first random access procedure configuration.

22. The method of claim 21, wherein performing the two-step random access procedure further comprises:
identifying a first set of time and frequency resources associated with a transmission, by the first wireless node, of a preamble of a first message of the two-step random access procedure, the first set of time and frequency resources at partially overlapping with a second set of time and frequency resources that are conditionally available, unavailable, or a combination thereof;

determining that the first set of time and frequency resources are available for receiving the preamble of the first message; and receiving, from the first wireless node, the preamble of the first message of the two-step random access procedure in the first set of time and frequency resources based at least in part on determining that the first set of time and frequency resources are available for receiving the preamble of the first message.

23. The method of claim 22, further comprising:

identifying a third set of time and frequency resources associated with a transmission, by the first wireless node, of a payload of the first message of the two-step random access procedure, the third set of time and frequency resources at partially overlapping with the second set of time and frequency resources that are conditionally available, unavailable, or a combination thereof;

transmitting a grant, to the first wireless node, for a third message of a four-step random access procedure based at least in part on receiving the preamble of the first message and identifying the third set of time and frequency resources; and receiving the third message from the first wireless node based at least in part on transmitting the grant, wherein the third message comprises the payload of the first message of the two-step random access procedure.

24. The method of claim 22, wherein performing the two-step random access procedure further comprises:

identifying a third set of time and frequency resources associated with a transmission, by the first wireless node, of a payload of the first message of the two-step random access procedure, the third set of time and frequency resources at partially overlapping with the second set of time and frequency resources that are conditionally available, unavailable, or a combination thereof;

determining that the third set of time and frequency resources are available for receiving the payload of the first message of the two-step random access procedure; and receiving, from the first wireless node, the payload of the first message of the two-step random access procedure by the third set of time and frequency resources.

25. The method of claim 24, wherein determining that the third set of time and frequency resources are available for receiving the payload of the first message of the two-step random access procedure is based at least in part on receiving the preamble of the first message of the two-step random access procedure from the first wireless node.

26. The method of claim 21, wherein transmitting system information that is indicative of both the first random access procedure configuration and the second random access procedure configuration further comprises:

transmitting the first random access procedure configuration and the second random access procedure configuration as separate configurations within the system information.

27. The method of claim 21, wherein transmitting system information that is indicative of both the first random access procedure configuration and the second random access procedure configuration further comprises:

transmitting a common random access procedure configuration in the system information; and transmitting configuration-specific parameters in the system information, wherein the first random access procedure configuration and the second random access procedure configuration are based at least in part on the common random access procedure configuration and the configuration-specific parameters.

28. The method of claim 21, further comprising:

configuring the first wireless node with a rule for using the first random access procedure configuration when the first random access procedure configuration is for a user equipment (UE)-specific two-step random access procedure.

29. An apparatus for wireless communication at a first wireless node, comprising:

a processor, memory coupled with the processor; and instructions stored in the memory and executable by the processor to cause the apparatus to:

receive, from a parent network entity, system information that is indicative of both a first random access procedure configuration for a two-step random access procedure and a second random access procedure configuration for a random access procedure which has more than two steps, wherein the first wireless node is a wireless backhaul node to the parent network entity;

determine to use the first random access procedure configuration instead of the second random access procedure configuration; and perform the two-step random access procedure with the parent network entity in accordance with the first random access procedure configuration.

30. An apparatus for wireless communication at a parent network entity, comprising:

a processor, memory coupled with the processor; and instructions stored in the memory and executable by the processor to cause the apparatus to:

transmit, to a first wireless node, system information that is indicative of both a first random access procedure configuration for a two-step random access procedure and a second random access procedure configuration for a random access procedure which has more than two steps, wherein the first wireless node is a wireless backhaul node to the parent network entity;

determine that the first random access procedure configuration instead of the second random access procedure configuration is being used by the first wireless node for communication with the parent network entity; and perform the two-step random access procedure with the first wireless node in accordance with the first random access procedure configuration.

* * * * *